United States Patent
Tatsuta et al.

(10) Patent No.: US 11,963,556 B2
(45) Date of Patent: Apr. 23, 2024

(54) POWER SUPPLY UNIT FOR AEROSOL INHALER, AEROSOL INHALER AND CHARGING UNIT FOR AEROSOL INHALER

(71) Applicant: JAPAN TOBACCO INC., Tokyo (JP)

(72) Inventors: Nobuhiro Tatsuta, Tokyo (JP); Hajime Fujita, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 582 days.

(21) Appl. No.: 17/088,597

(22) Filed: Nov. 4, 2020

(65) Prior Publication Data

US 2021/0127755 A1  May 6, 2021

(30) Foreign Application Priority Data

Nov. 5, 2019 (JP) ................. 2019-201069

(51) Int. Cl.
*A24F 13/00* (2006.01)
*A24F 40/465* (2020.01)
*A24F 40/90* (2020.01)

(52) U.S. Cl.
CPC ............ *A24F 40/90* (2020.01); *A24F 40/465* (2020.01)

(58) Field of Classification Search
CPC ....................................... A24F 48/00
USPC .................................. 131/328–329
See application file for complete search history.

(56) References Cited

U.S. PATENT DOCUMENTS 11,516,894 B2 * 11/2022 Gill .................. H02J 7/0044
2011/0265806 A1   11/2011 Alarcon et al.
2015/0002090 A1   1/2015 Nakaya et al.
2015/0053214 A1   2/2015 Alarcon et al.
2015/0059779 A1   3/2015 Alarcon et al.
2015/0333561 A1   11/2015 Alarcon
2017/0133887 A1   5/2017 Tominaga et al.
2017/0196269 A1   7/2017 Bernauer et al.
2017/0302324 A1   10/2017 Stanimirovic et al.
2018/0140021 A1   5/2018 Alarcon et al.
2018/0146712 A1   5/2018 Alarcon et al.
2018/0192709 A1   7/2018 Alarcon et al.
2018/0242645 A1   8/2018 Alarcon et al.
2018/0271156 A1   9/2018 Alarcon et al.
2019/0297947 A1   10/2019 Bessant et al.
2020/0196670 A1   6/2020 Alarcon et al.
(Continued)

FOREIGN PATENT DOCUMENTS

CN   108135276 A   6/2018
JP   2013-165634 A   8/2013
(Continued)

OTHER PUBLICATIONS

Office Action dated Jan. 19, 2021, in corresponding Japanese patent Application No. 2019-201069, 5 pages.
(Continued)

*Primary Examiner* — Phuong K Dinh
(74) *Attorney, Agent, or Firm* — XSENSUS LLP

(57) ABSTRACT

A power supply unit for an aerosol inhaler includes: a power supply configured to store power to generate aerosol from an aerosol source; and a charger capable of controlling charging of the power supply, the power supply unit for the aerosol inhaler further includes: a power reception coil capable of receiving the power in a wireless manner; and an inverter connected between the power reception coil and the charger.

13 Claims, 20 Drawing Sheets

(56) References Cited

U.S. PATENT DOCUMENTS

| | | | |
|---|---|---|---|
| 2020/0229502 A1 | 7/2020 | Akao | |
| 2020/0229503 A1 | 7/2020 | Akao | |
| 2020/0229504 A1 | 7/2020 | Akao | |
| 2020/0229505 A1 | 7/2020 | Akao | |
| 2020/0233444 A1 | 7/2020 | Akao | |
| 2020/0235599 A1 | 7/2020 | Akao | |
| 2020/0235600 A1 | 7/2020 | Akao | |
| 2020/0253287 A1* | 8/2020 | Sur | H01M 10/0525 |
| 2020/0275711 A9 | 9/2020 | Alarcon et al. | |

FOREIGN PATENT DOCUMENTS

| | | |
|---|---|---|
| JP | 6326188 B2 | 5/2018 |
| JP | 2019-41497 A | 3/2019 |
| JP | 2019-510469 A | 4/2019 |
| JP | 6557433 B1 | 8/2019 |
| WO | 2011/137453 A2 | 11/2011 |
| WO | 2016/035333 A1 | 3/2016 |
| WO | 2017/068098 A1 | 4/2017 |
| WO | 2018/190985 A1 | 10/2018 |
| WO | 2019/048379 A1 | 3/2019 |

OTHER PUBLICATIONS

Notice of Reasons for Refusal received for Japanese Patent Application No. 2019-201069, dated Feb. 12, 2020, 4 pages.
Notice of Reasons for Refusal received for Japanese Patent Application No. 2019-201069, dated Jul. 7, 2020, 2 pages.
European search report dated Mar. 19, 2021, in corresponding European patent Application No. 20205394.8, 5 pages.
Office Action issued on Jan. 13, 2024, in the corresponding Chinese patent Application No. 202011221309.5, 19 pages (with translation).

* cited by examiner

| | BYPASS CIRCUIT SWITCH | SMOOTHING CAPACITOR SWITCH | INVERTER | CHARGER |
|---|---|---|---|---|
| POWER RECEPTION MODE | OFF | ON | OFF (ALWAYS ON, DIRECT CONNECTION) | OPERATE |
| POWER TRANSMISSION MODE | ON | OFF | ON / OFF (DC→AC CONVERSION) | STOP |

FIG. 15

|  | POWER RECEPTION COIL SWITCH | INDUCTION HEATING COIL SWITCH | BYPASS CIRCUIT SWITCH | INVERTER | CHARGER |
|---|---|---|---|---|---|
| WIRELESS CHARGING MODE | ON | OFF | OFF | OFF (ALWAYS ON, DIRECT CONNECTION) | OPERATE |
| IH MODE | OFF | ON | ON | ON / OFF (DC→AC CONVERSION) | STOP |

FIG. 21

|  | POWER RECEPTION COIL SWITCH | INDUCTION HEATING COIL SWITCH | BYPASS CIRCUIT SWITCH | INVERTER | CHARGER |
|---|---|---|---|---|---|
| CHARGING MODE | ON | OFF | OFF | OFF (ALWAYS ON, DIRECT CONNECTION) | OPERATE |
| POWER TRANSMISSION MODE | OFF | ON | ON | ON / OFF (DC→AC CONVERSION) | STOP |

POWER SUPPLY UNIT FOR AEROSOL INHALER, AEROSOL INHALER AND CHARGING UNIT FOR AEROSOL INHALER

CROSS REFERENCE TO RELATED APPLICATIONS

This application claims priority to Japanese Patent Application No. 2019-201069 filed on Nov. 5, 2019, the content of which is incorporated herein by reference.

TECHNICAL FIELD

The present invention relates to a power supply unit for an aerosol inhaler, an aerosol inhaler and a charging unit for an aerosol inhaler.

BACKGROUND ART

A power supply unit for an aerosol inhaler capable of wired charging or wireless charging has been known (JP 6326188 B and US 2015/0333561 A). For example, JP 6326188 B discloses that a power supply unit for an electronic smoking device may be a wireless type induction charging system or a contact type charging system.

US 2015/0333561 A discloses a portable charging device in which a power transmission coil is arranged, and an aerosol inhaler including a weight for aligning the power transmission coil and a power reception coil.

JP 2019-510469 T discloses a power supply unit for an aerosol inhaler in which a power transmission coil is arranged, and a heating device for the aerosol inhaler in which a power reception coil is arranged.

Although it has been proposed to further expand function of this type of aerosol inhaler or the power supply unit for the aerosol inhaler, a circuit configuration may be complicated if the function is expanded.

An object of the present invention is to provide a power supply unit for an aerosol inhaler, an aerosol inhaler and a charging unit for an aerosol inhaler, capable of expanding function while preventing complication of a circuit configuration.

SUMMARY OF INVENTION

According to an aspect of the present invention, a power supply unit for an aerosol inhaler includes: a power supply configured to store power to generate aerosol from an aerosol source; and a charger capable of controlling charging of the power supply, the power supply unit for the aerosol inhaler further includes: a power reception coil capable of receiving the power in a wireless manner; and an inverter connected between the power reception coil and the charger.

BRIEF DESCRIPTION OF DRAWINGS

FIG. 15 is a diagram showing mode switching conditions of the circuit configuration shown in FIG. 12.

FIG. 21 is a diagram showing mode switching conditions of the circuit configuration shown in FIG. 18.

DESCRIPTION OF EMBODIMENTS

Hereinafter, a power supply unit for an aerosol inhaler (including an aerosol inhaler and a charging unit for an aerosol inhaler) according to embodiments of the present invention will be described.

First Embodiment (Aerosol Inhaler)

Figure 1:
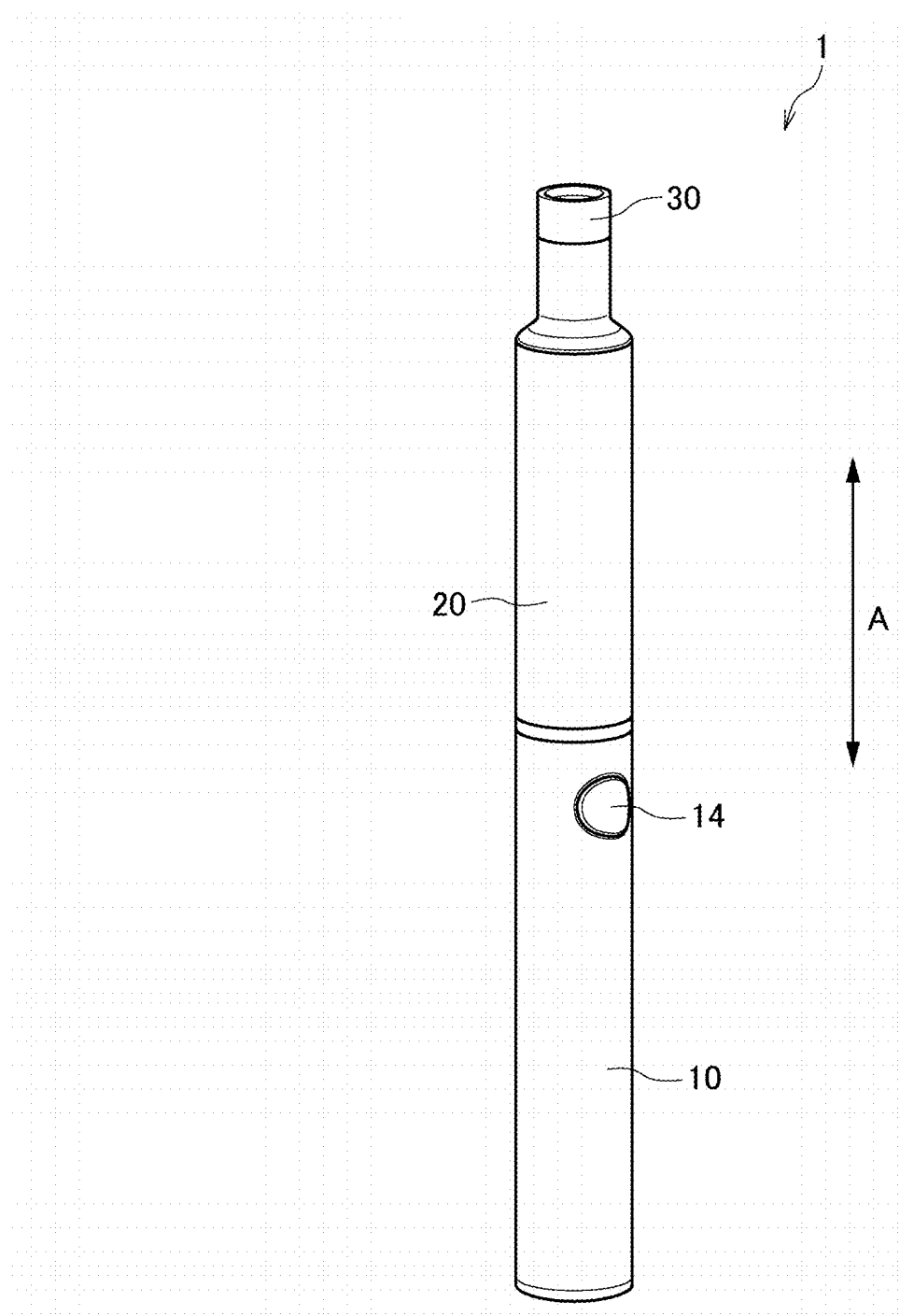
FIG. 1 is a perspective view of an aerosol inhaler equipped with a power supply unit according to an embodiment of the present invention.
Figure 2:
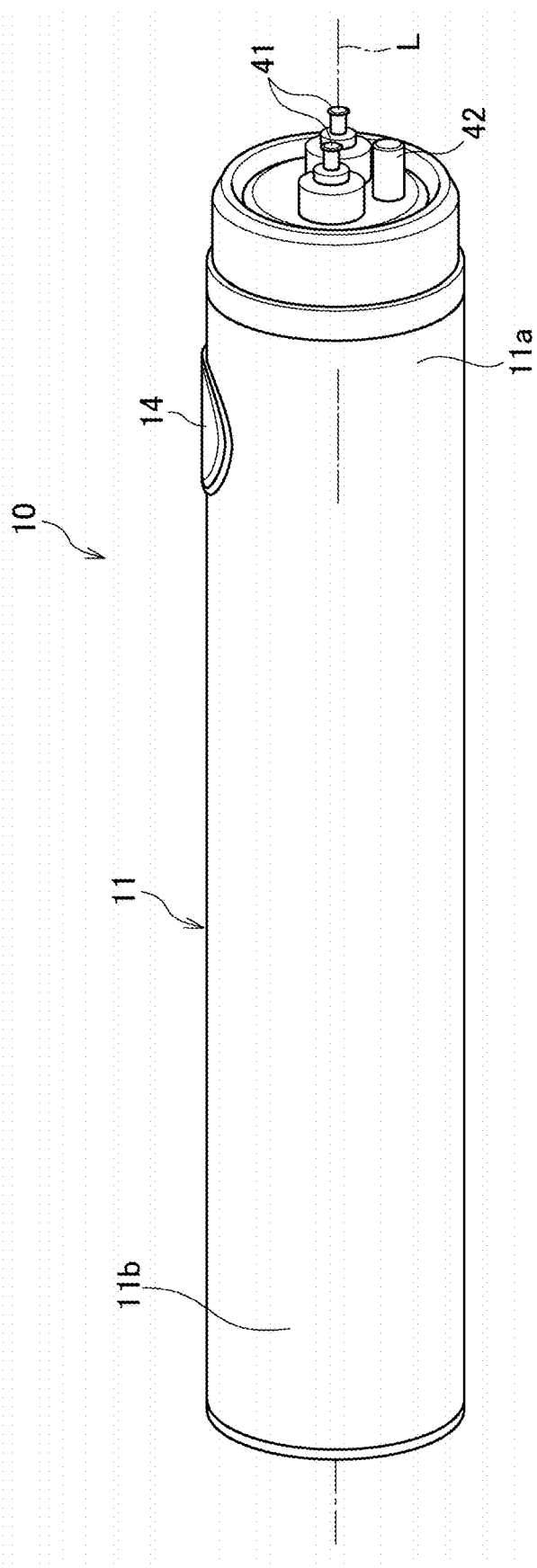
FIG. 2 is a perspective view of the power supply unit of the aerosol inhaler shown in FIG. 1.

An aerosol inhaler 1 is a device for inhaling a flavor without combustion, and has a rod shape extending along a predetermined direction (hereinafter referred to as a longitudinal direction A). As shown in FIG. 1, the aerosol inhaler 1 is provided with a power supply unit 10, a first cartridge 20 and a second cartridge 30 in this order along the longitudinal direction A. The first cartridge 20 is attachable to and detachable from the power supply unit 10, and the second cartridge 30 is attachable to and detachable from the first cartridge 20. In other words, the first cartridge 20 and the second cartridge 30 are replaceable.

(Power Supply Unit)

As shown in FIGS. 2 and 3, the power supply unit 10 according to a first embodiment accommodates a power supply 12, a charger 13, a control unit 50, various sensors and the like inside a cylindrical power supply unit case 11.

Discharge terminals 41 are provided on a top portion 11*a* located on one end side (a first cartridge 20 side) of the power supply unit case 11 in the longitudinal direction A. The discharge terminals 41 are provided so as to protrude from an upper surface of the top portion 11*a* toward the first cartridge 20, and are configured to be electrically connectable to a load 21 of the first cartridge 20.

An air supply portion 42 that supplies air to the load 21 of the first cartridge 20 is provided on the upper surface of the top portion 11*a* in vicinity of the discharge terminals 41.

A power reception coil 43 for charging the power supply 12 in a wireless manner with an external power supply (not shown) and an inverter 44 that functions as a rectifier configured to convert AC power received by the power reception coil 43 into DC power are accommodated in a bottom portion 11*b* located on the other end side (a side opposite to the first cartridge 20) of the power supply unit case 11 in the longitudinal direction A. A method of wireless power transfer may be an electromagnetic induction method, a magnetic resonance method, a combination of the electromagnetic induction method and the magnetic resonance method, or other methods. In any method of wireless power transfer, the power supply unit case 11 may or may not be in physical contact with the external power supply. In the present specification, the wireless power transfer is treated as being synonymous with non-contact power transfer.

A user-operable operation unit 14 is provided on a side surface of the top portion 11*a* of the power supply unit case 11. The operation unit 14 includes a button type switch, a touch panel and the like, and is used when the control unit 50 and various sensors are activated or shut off, which reflects intention of a user.

The power supply 12 is a rechargeable secondary battery, and is preferably a lithium ion secondary battery, and stores power for generating aerosol from an aerosol source 22 described below. The charger 13 controls charging power input from the inverter 44 to the power supply 12. The charger 13 is configured by using a charging IC including a DC-DC converter, a voltmeter, an ammeter, a processor and the like.

As shown in FIG. 4, the control unit 50 is connected to the charger 13, the operation unit 14, various sensor devices such as an intake sensor 15 that detects a puff (intake) operation, a voltage sensor 16 that measures a voltage of the power supply 12, a temperature sensor 17 that detects a temperature, and a memory 18 that stores the number of puff operations or time for energizing the load 21. The control unit 50 performs various controls on the aerosol inhaler 1. The intake sensor 15 may be constituted by a condenser microphone, a pressure sensor or the like. Specifically, the control unit 50 is a processor (MCU: micro controller unit). More specifically, a structure of the processor is an electric circuit obtained by combining circuit elements such as semiconductor elements.

(First Cartridge)

As shown in FIG. 3, the first cartridge 20 includes, inside a cylindrical cartridge case 27, a reservoir 23 that stores an aerosol source 22, the electric load 21 that atomizes the aerosol source 22, a wick 24 that draws the aerosol source from the reservoir 23 to the load 21, an aerosol flow path 25 in which aerosol generated by atomization of the aerosol source 22 flows toward the second cartridge 30, and an end cap 26 that accommodates a part of the second cartridge 30.

The reservoir 23 is partitioned and formed so as to surround a periphery of the aerosol flow path 25, and stores the aerosol source 22. A porous body such as a resin web or cotton may be accommodated in the reservoir 23, and the aerosol source 22 may be impregnated in the porous body. The reservoir 23 may only store the aerosol source 22 without accommodating the porous body such as the resin web or the cotton. The aerosol source 22 includes a liquid such as glycerin, propylene glycol or water.

The wick 24 is a liquid holding member that draws the aerosol source 22 from the reservoir 23 to the load 21 by using a capillary phenomenon, and is formed of, for example, glass fiber or porous ceramic.

The load 21 atomizes the aerosol source 22 without combustion with the power supplied from the power supply 12 via the discharge terminals 41. The load 21 is formed of an electric heating wire (coil) wound at a predetermined pitch. The load 21 may be any element capable of generating the aerosol by atomizing the aerosol source 22, and is, for example, a heating element or an ultrasonic generator. Examples of the heating element include a heating resistor, a ceramic heater and an induction heating type heater.

The aerosol flow path 25 is provided on a downstream side of the load 21 and on a center line L of the power supply unit 10.

The end cap 26 includes a cartridge accommodation portion 26*a* that accommodates a part of the second cartridge 30, and a communication path 26*b* that allows the aerosol flow path 25 and the cartridge accommodation portion 26*a* to communicate with each other.

(Second Cartridge)

The second cartridge 30 stores a flavor source 31. The second cartridge 30 is detachably accommodated in the cartridge accommodation portion 26*a* provided in the end cap 26 of the first cartridge 20. An end portion of the second cartridge 30 on a side opposite to the first cartridge 20 is a suction port 32 for the user. The suction port 32 is not limited to being integrally formed with the second cartridge 30, but may be configured to be attachable to and detachable from the second cartridge 30. By configuring the suction port 32 separately from the power supply unit 10 and the first cartridge 20 in this way, the suction port 32 can be kept hygienic.

The second cartridge 30 imparts the flavor to the aerosol by passing the aerosol generated by atomizing the aerosol source 22 by the load 21 through the flavor source 31. As a raw material piece constituting the flavor source 31, chopped tobacco or a molded product obtained by molding a tobacco raw material into particles can be used. The flavor source 31 may be formed of a plant other than tobacco (for example, mint, Chinese herb or herb). The flavor source 31 may be provided with a fragrance such as menthol.

In the aerosol inhaler 1 according to the present embodiment, the aerosol to which the flavor is added can be generated by the aerosol source 22, the flavor source 31 and the load 21. That is, the aerosol source 22 and the flavor source 31 can be referred to as an aerosol generation source that generates the aerosol.

In addition to a configuration in which the aerosol source 22 and the flavor source 31 are separated from each other, a configuration in which the aerosol source 22 and the flavor source 31 are integrally formed, a configuration in which the flavor source 31 is omitted and substances that may be included in the flavor source 31 are added to the aerosol source 22, or a configuration in which a drug, a Chinese herb or the like instead of the flavor source 31 is added to the aerosol source 22 may also be employed as the configuration of the aerosol generation source used in the aerosol inhaler 1.

Figure 3:
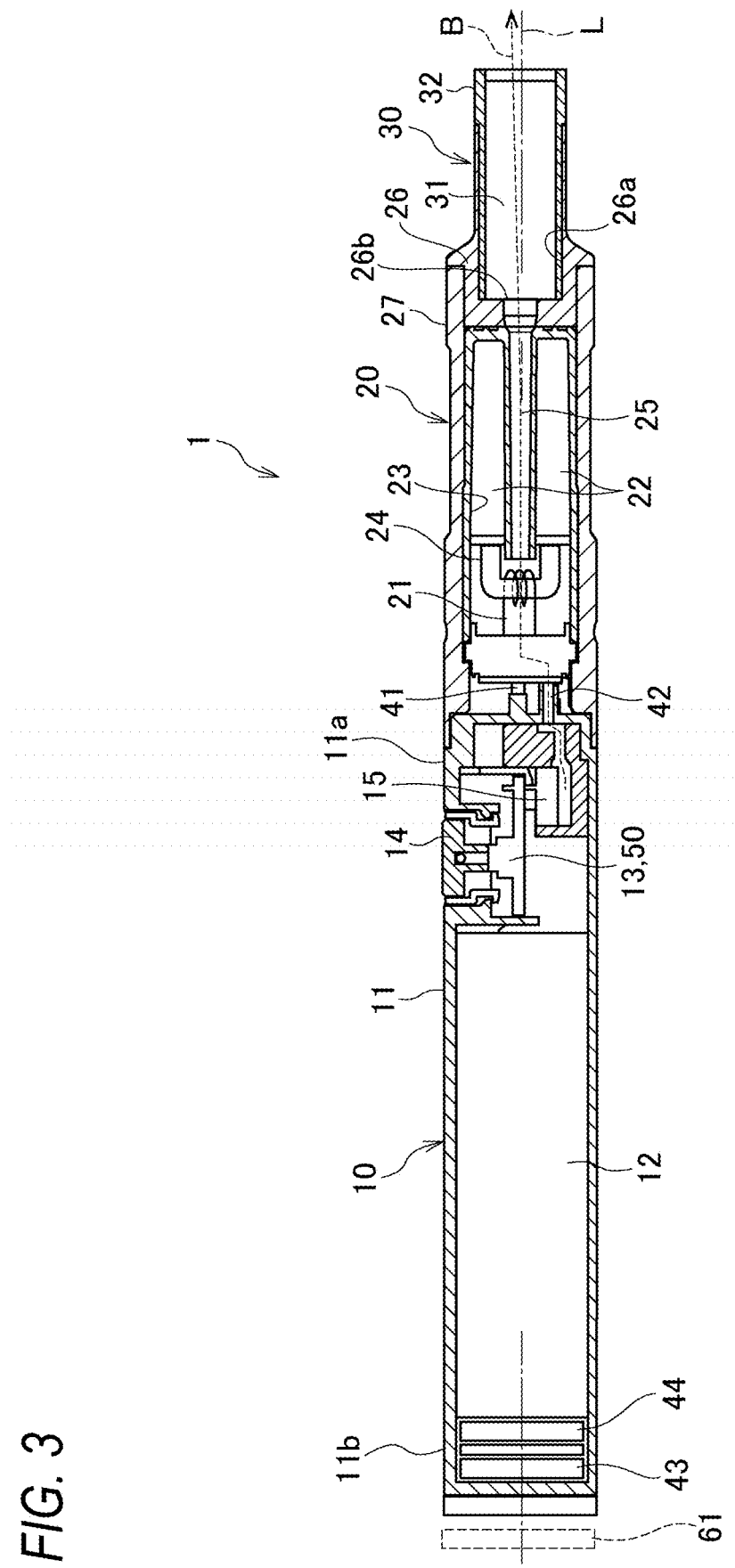
FIG. 3 is a sectional view of the aerosol inhaler shown in FIG. 1.

In the aerosol inhaler 1 configured as described above, as shown by an arrow B in FIG. 3, the air flowing in from an air intake port (not shown) provided in the power supply unit case 11 passes through vicinity of the load 21 of the first cartridge 20 from the air supply portion 42. The load 21 atomizes the aerosol source 22 drawn or moved from the reservoir 23 by the wick 24. The aerosol generated by atomization flows through the aerosol flow path 25 together with the air flowing in from the air intake port, and is supplied to the second cartridge 30 via the communication path 26b. The aerosol supplied to the second cartridge 30 is imparted the flavor by passing through the flavor source 31, and is supplied to the suction port 32.

The aerosol inhaler 1 is provided with a notification unit 45 that notifies various types of information. The notification unit 45 may be constituted by a light emitting element, a vibration element or a sound output element. The notification unit 45 may also be a combination of two or more elements among the light emitting element, the vibration element and the sound output element. The notification unit 45 may be provided in any of the power supply unit 10, the first cartridge 20 and the second cartridge 30, but is preferably provided in the power supply unit 10 in order to shorten a conductive wire from the power supply 12. For example, a periphery of the operation unit 14 is translucent, and is configured to emit light by a light emitting element such as an LED.

(Electric Circuit)

Next, an electric circuit of the power supply unit 10 will be described with reference to FIG. 5.

The power supply unit 10 includes the power supply 12, a positive electrode side discharge terminal 41a and a negative electrode side discharge terminal 41b constituting the discharge terminals 41, the control unit 50 connected between a positive electrode side of the power supply 12 and the positive electrode side discharge terminal 41a and between a negative electrode side of the power supply 12 and the negative electrode side discharge terminal 41b, a wireless charging circuit 46 including the power reception coil 43 and the inverter 44, the charger 13 arranged on a power transmission path between the wireless charging circuit 46 and the power supply 12, and a switch 19 arranged on the power transmission path between the power supply 12 and the discharge terminals 41. The switch 19 is formed of, for example, a MOSFET, and is controlled to be opened and closed by the control unit 50 adjusting a gate voltage.

(Control Unit)

Figure 4:
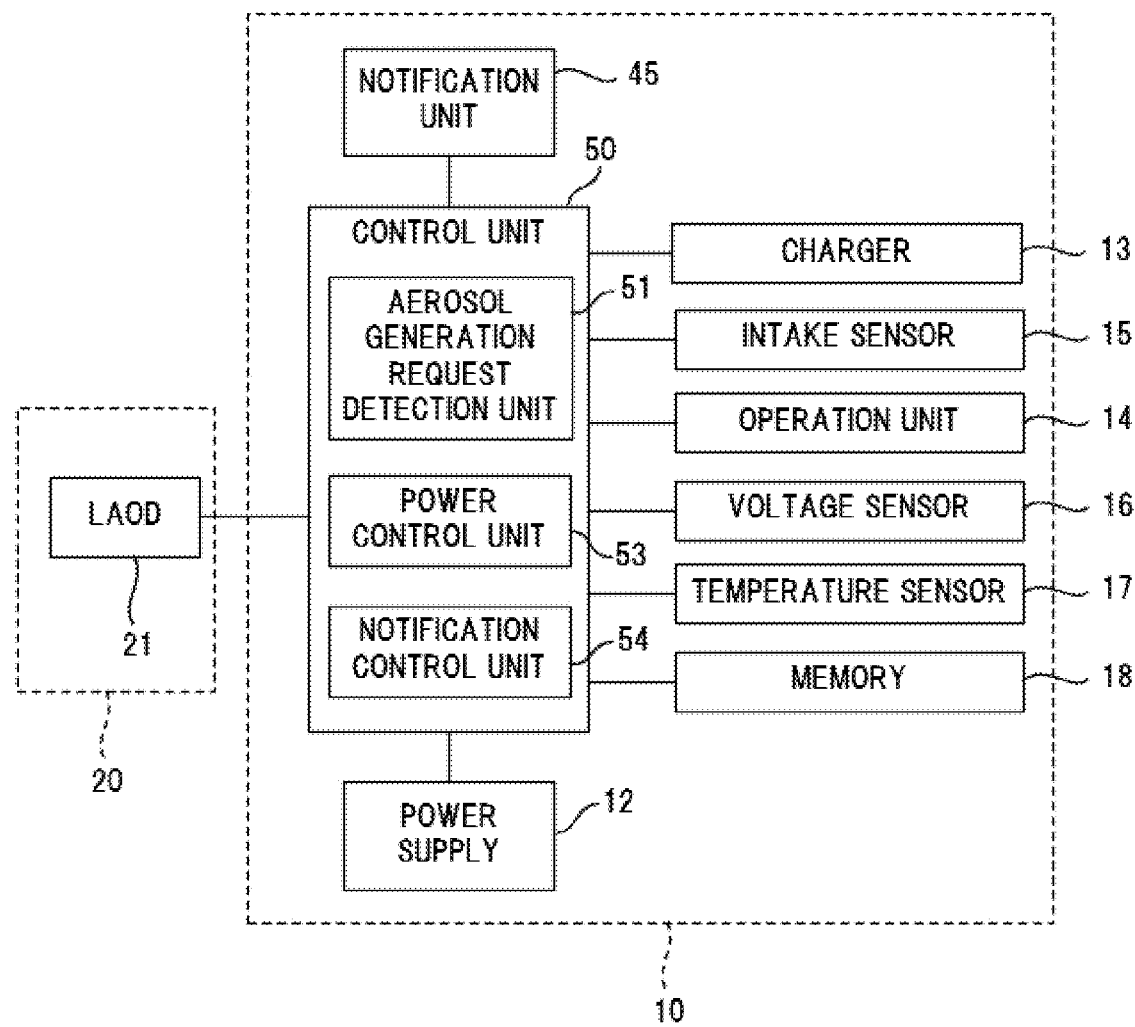
FIG. 4 is a block diagram showing a main part configuration of the power supply unit of the aerosol inhaler shown in FIG. 1.

As shown in FIG. 4, the control unit 50 includes an aerosol generation request detection unit 51, a power control unit 53 and a notification control unit 54.

The aerosol generation request detection unit 51 detects an aerosol generation request based on an output result of the intake sensor 15. The intake sensor 15 is configured to output a value of a change in pressure in the power supply unit 10 caused by suction of the user through the suction port 32. The intake sensor 15 is, for example, a pressure sensor that outputs an output value (for example, a voltage value or a current value) corresponding to an air pressure that changes due to a flow rate of the air sucked from the air intake port toward the suction port 32 (that is, the puff operation of the user). The intake sensor may be configured to determine whether the detected flow rate or pressure of the air can correspond to the puff operation of the user and output one of an ON value and an OFF value.

The notification control unit 54 controls the notification unit 45 to notify various types of information. For example, the notification control unit 54 controls the notification unit 45 to notify a replacement timing of the second cartridge 30 according to detection of the replacement timing of the second cartridge 30. The notification control unit 54 notifies the replacement timing of the second cartridge 30 based on the number of the puff operations or the cumulative time for energizing the load 21 stored in the memory 18. The notification control unit 54 may notify not only the replacement timing of the second cartridge 30, but also a replacement timing of the first cartridge 20, a replacement timing of the power supply 12, a charging timing of the power supply 12 and the like.

When the aerosol generation request detection unit 51 detects the aerosol generation request, the power control unit 53 controls discharge of the power supply 12 via the discharge terminals 41 by turning on or turning off the switch 19.

The power control unit 53 performs control such that an amount of the aerosol generated by atomizing the aerosol source by the load 21 falls within a desired range, in other words, an amount of the power supplied from the power supply 12 to the load 21 falls within a certain range. Specifically, the power control unit 53 controls on/off of the switch 19 by, for example, pulse width modulation (PWM) control. Instead of this, the power control unit 53 may control the on/off of the switch 19 by pulse frequency modulation (PFM) control.

The power control unit 53 may stop power supply from the power supply 12 to the load 21 when a predetermined period has elapsed since the power supply to the load 21 is started. In other words, the power control unit 53 stops the power supply from the power supply 12 to the load 21 when a puff period exceeds the predetermined period even within the puff period when the user actually performs the puff operation. The predetermined period is set in order to reduce variations in the puff period of the user. The power control unit 53 controls a duty ratio of the on/off of the switch 19 during one puff operation according to an amount of electricity stored in the power supply 12. For example, the power control unit 53 controls an on-time interval (a pulse interval) for supplying power from the power supply 12 to the load 21, and controls an on-time length (a pulse width) for supplying power from the power supply 12 to the load 21.

The power control unit 53 detects power reception from the external power supply by the power reception coil 43, and controls charging of the power supply 12 via the charger 13.

(Wireless Charging Circuit)

Figure 5:
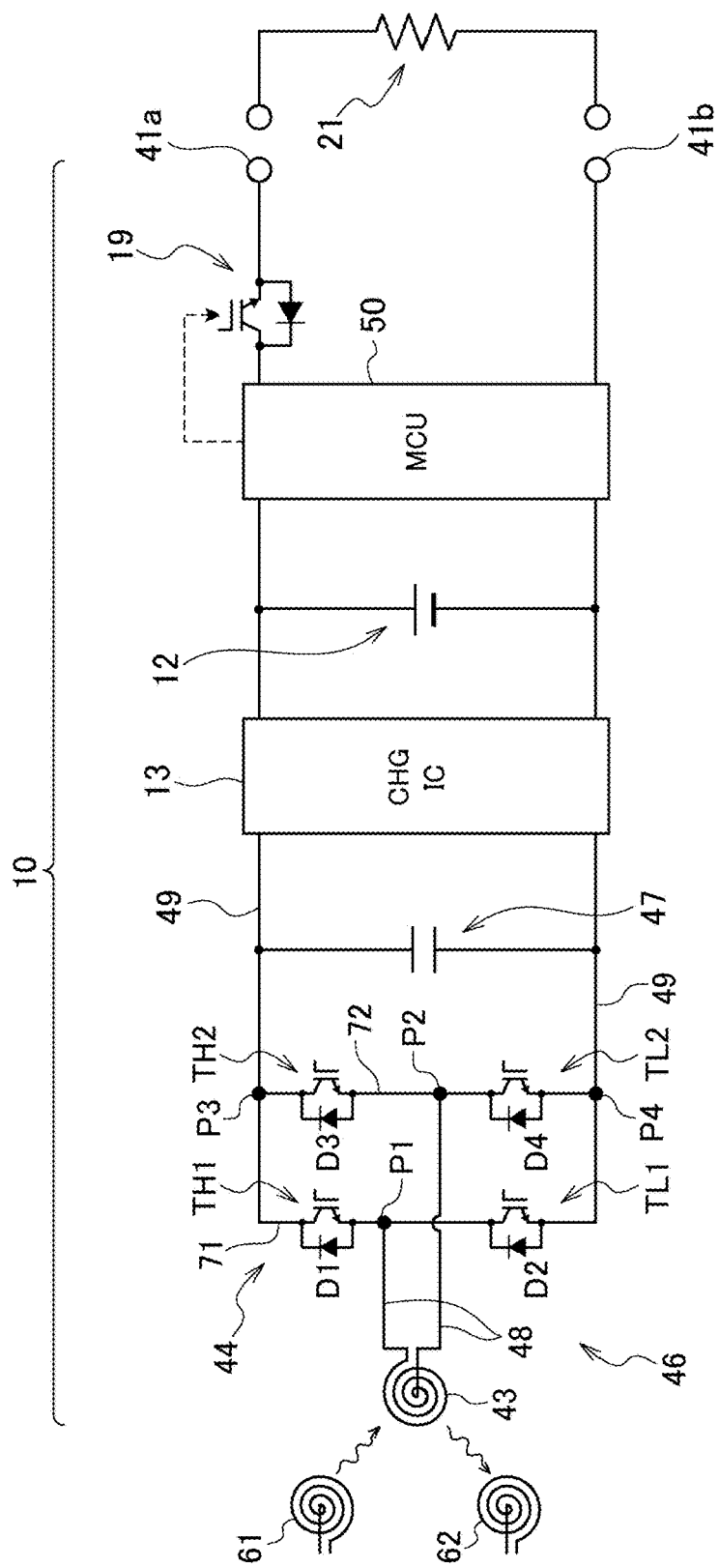
FIG. 5 is a schematic diagram showing a circuit configuration of the power supply unit of the aerosol inhaler shown in FIG. 1.

As shown in FIG. 5, the wireless charging circuit 46 includes the power reception coil 43, the inverter 44, a smoothing capacitor 47, an AC conductive wire 48 and a DC conductive wire 49.

During charging, the power reception coil 43 is arranged close to a power transmission coil 61 that is excited by the AC power from the external power supply in the wireless manner, and receives the AC power from the power transmission coil 61.

The inverter 44 is configured to be operable as a rectifier that converts the AC power received by the power reception coil 43 into the DC power when the power supply 12 is in wireless charging. The DC power converted by the inverter 44 is smoothed by the smoothing capacitor 47. A specific configuration and operation of the inverter 44 will be described below.

The AC conductive wire 48 connects the power reception coil 43 and the inverter 44, and supplies the AC power received by the power reception coil 43 to the inverter 44. The DC conductive wire 49 connects the inverter 44 and the charger 13, and supplies the DC power converted by the inverter 44 to the charger 13.

(Inverter)

To describe the inverter 44 according to the present embodiment specifically, the inverter 44 includes: a first high-side transistor TH1, a first low-side transistor TL1, a first tributary circuit 71 including a first connection point P1 connecting the first high-side transistor TH1 and the first low-side transistor TL1 in series; a second high-side transistor TH2, a second low-side transistor TL2, a second tributary circuit 72 including a second connection point P2 connecting the second high-side transistor TH2 and the second low-side transistor TL2 in series, a third connection point P3 and a fourth connection point P4 connecting the first tributary circuit 71 and the second tributary circuit 2 in parallel. The first connection point P1 and the second connection point P2 are respectively connected to both ends of the power reception coil 43 via the AC conductive wire 48. The third connection point P3 is connected to the charger 13 via the positive electrode side DC conductive wire 49, and the fourth connection point P4 is connected to the charger 13 via the negative electrode side DC conductive wire 49. Each of transistors TH1, TL1, TH2, TL2 is formed of, for example, a MOSFET, and is controlled to be opened and closed by the control unit 50 adjusting a gate voltage.

Diodes D1 to D4 that operate as free-wheeling diodes are respectively connected in parallel to the transistors TH1, TL1, TH2, TL2. When the transistors TH1, TL1, TH2, TL2 are turned off, the free-wheeling diode is provided to prevent damage to the transistor by causing a current flowing back from a power reception coil 43 side to flow back (regenerate) to a power supply 12 side. When all the transistors TH1, TL1, TH2, TL2 are turned off, the diodes D1 to D4 can function as the rectifier that converts the AC power received by the power reception coil 43 into the DC power.

Specifically, an anode of the diode D1 and a cathode of the diode D2 are connected to the AC conductive wire 48 extending from one end of the power reception coil 43 at the first connection point P1, and an anode of the diode D3 and a cathode of the diode D4 are connected to the AC conductive wire 48 extending from the other end of the power reception coil 43 at the second connection point P2. Cathodes of the diodes D1 and D3 are connected to the positive electrode side DC conductive wire 49 at the third connection point P3, and anodes of the diodes D2 and D4 are connected to the negative electrode side DC conductive wire 49 at the fourth connection point P4. That is, the four diodes D1 to D4 are bridge-connected and can be operated as a full-wave rectifier circuit when all the transistors TH1, TL1, TH2, TL2 are turned off.

The control unit 50, as a control mode of the inverter 44, includes a power reception mode in which all the transistors TH1, TL1, TH2, TL2 are turned off and the inverter 44 is operated as the rectifier, and a power transmission mode in which the DC power of the power supply 12 is converted into the AC power and is supplied to the power reception coil 43 based on switching control of the transistors TH1, TL1, TH2, TL2. Specifically, in the power transmission mode, by alternately repeating a state where the first high-side transistor TH1 and the second low-side transistor TL2 are turned on, and the second high-side transistor TH2 and the first low-side transistor TL1 are turned off, so that a forward current flows through the power reception coil 43, and a state where the first high-side transistor TH1 and the second low-side transistor TL2 are turned off, and the second high-side transistor TH2 and the first low-side transistor TL1 are turned on, so that a reverse current flows through the power reception coil 43, the power reception coil 43 can be excited with the AC power and the power reception coil 43 can be operated as a power transmission coil that transmits the AC power to a power reception coil 62 of another device in the wireless manner.

According to the power supply unit 10 of the present embodiment configured as described above, since the inverter 44 has two functions: a function as the rectifier that converts the AC power received by the power reception coil 43 into the DC power and a function of generating the AC power from the power supply 12 in the power supply unit 10, it is possible to improve expandability of function of the power supply unit 10 while preventing complication of a circuit configuration.

Further, in the present embodiment, since the power reception coil 43 is used for both wireless power transmission and power reception, the multifunctional power supply unit 10 can be effectively prevented from being increasing in weight and size while being capable of transmitting and receiving power.

First Modification of First Embodiment

Figure 6:
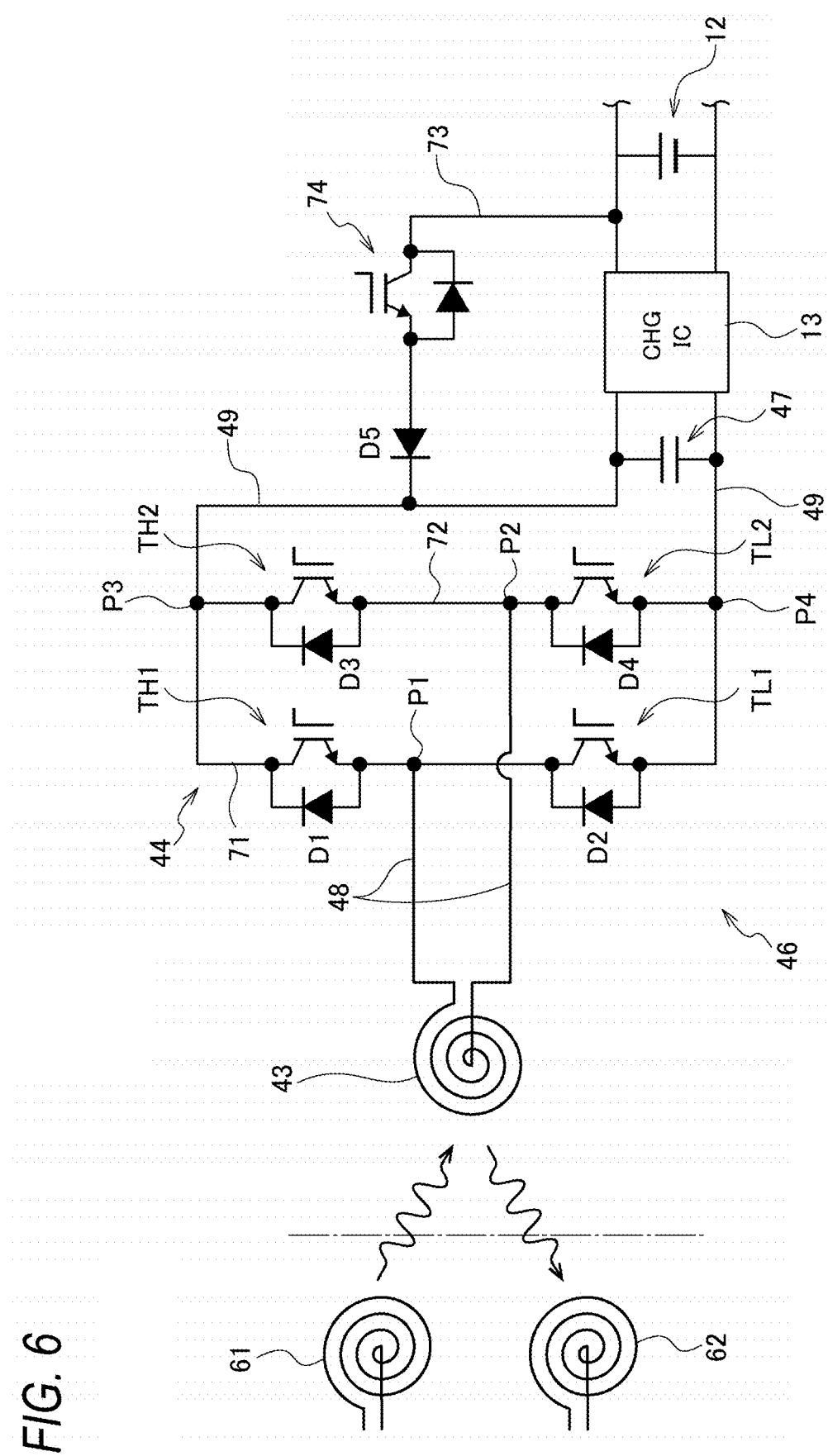
FIG. 6 is a schematic diagram showing a first modification of the circuit configuration of the power supply unit of the aerosol inhaler shown in FIG. 1.

An electric circuit of the power supply unit 10 according to the first embodiment may be modified as shown in FIG. 6. In FIGS. 6 to 9, a circuit between the power supply 12 and the discharge terminal 41 is not shown. Specifically, an electric circuit according to the present modification further includes a bypass circuit 73 connected to the power supply 12 and the inverter 44 so as to be in parallel with the charger 13, and a bypass circuit switch 74 provided in the bypass circuit 73 to connect and disconnect electrical connection between the power supply 12 and the inverter 44. The bypass circuit switch 74 includes, for example, a MOSFET and a diode connected in parallel, and is controlled to be opened and closed by the control unit 50 adjusting a gate voltage of the MOSFET. The bypass circuit 73 is preferably provided with a diode D5 that regulates a flow of a current from the inverter 44 to the bypass circuit 73.

According to such a power supply unit 10, when the bypass circuit switch 74 is turned on in the power transmission mode, the power can be supplied from the power supply 12 to the inverter 44 and the power reception coil 43 without passing through the charger 13, so that power loss in the power transmission mode can be reduced. In the power transmission mode, if the control unit 50 controls the charger 13 to stop functioning, the power discharged from the power supply 12 can be prevented from circulating in the power transmission mode and returning to the power supply 12. Therefore, efficiency in the power transmission mode can be improved.

In addition, when the bypass circuit switch 74 is turned off in the power reception mode, the received charging power is supplied to the charger 13 without passing through the bypass circuit 73, so that the power supply 12 can be appropriately charged. Further, since the power immediately after rectification by the inverter 44 not passing through the charger 13 is not supplied to the power supply 12, the power supply 12 can be appropriately protected.

Second Modification of First Embodiment

Figure 7:
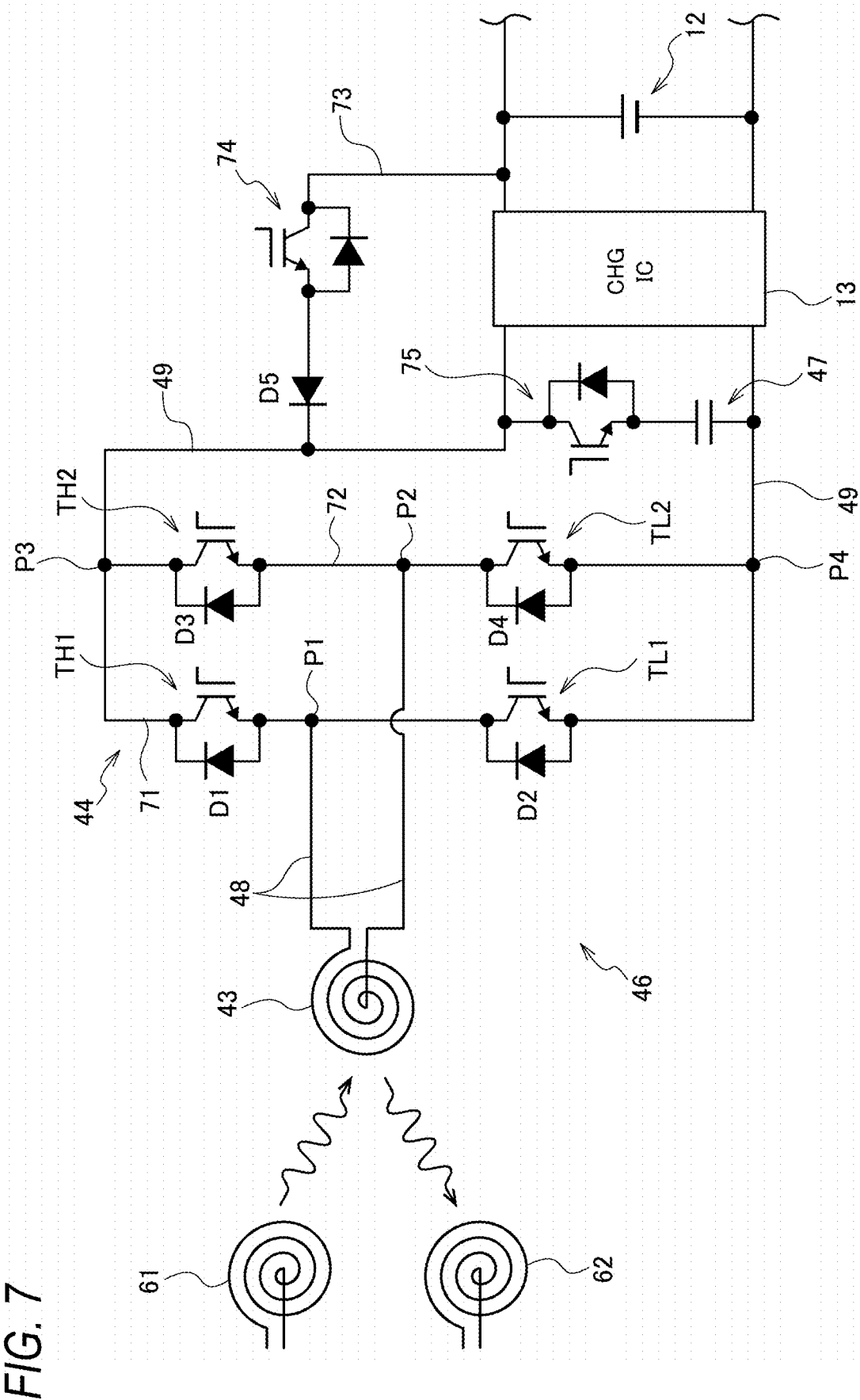
FIG. 7 is a schematic diagram showing a second modification of the circuit configuration of the power supply unit of the aerosol inhaler shown in FIG. 1.

The electric circuit of the power supply unit 10 according to the first embodiment may be further modified as shown in FIG. 7. Specifically, an electric circuit according to the present modification further includes a smoothing capacitor switch 75 that connects and disconnects electrical connection between one end of the bypass circuit 73 and the smoothing capacitor 47. The smoothing capacitor switch 75 includes, for example, a MOSFET and a diode connected in parallel, and is controlled to be opened and closed by the control unit 50 adjusting a gate voltage of the MOSFET.

According to such a power supply unit 10, when the bypass circuit switch 74 is turned on and the smoothing capacitor switch 75 is turned off in the power transmission mode, the smoothing capacitor 47 can be bypassed, so that a time lag generated due to charging of the smoothing capacitor 47 can be eliminated and the power transmission mode can be quickly started.

Figure 8:
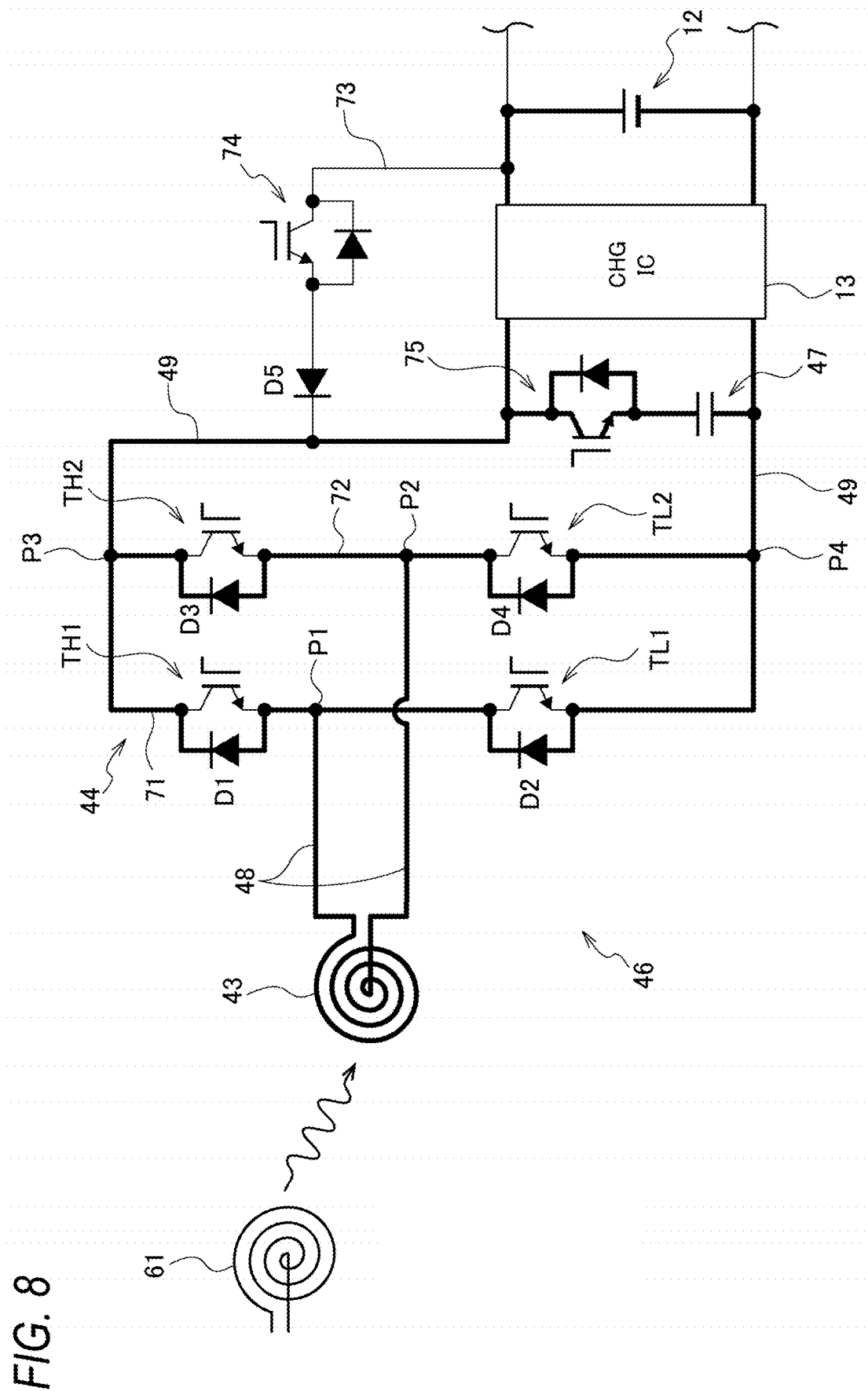
FIG. 8 is a diagram showing a flow of electricity when the power supply unit is in wireless charging (in a power reception mode) in the circuit configuration shown in FIG. 7.
Figure 9:
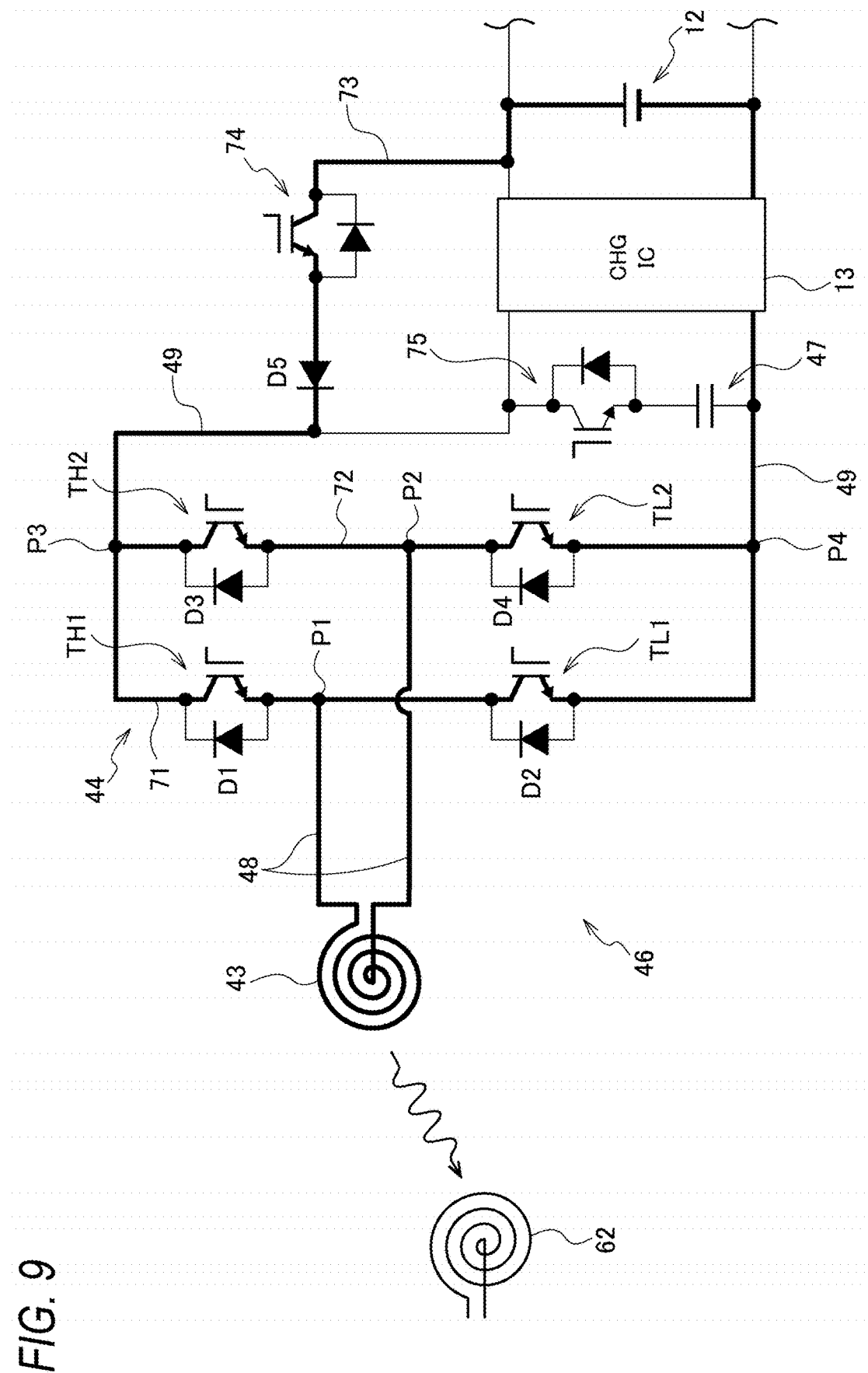
FIG. 9 is a diagram showing a flow of electricity when power is transmitted to another device (in a power transmission mode) in the circuit configuration shown in FIG. 7.

Switching conditions of the inverter 44, the bypass circuit switch 74 and the smoothing capacitor switch 75 in the power reception mode and the power transmission mode, and operation of each unit in the power reception mode and the power transmission mode will be described with reference to FIGS. 8 to 10.

Figures 10, 11:
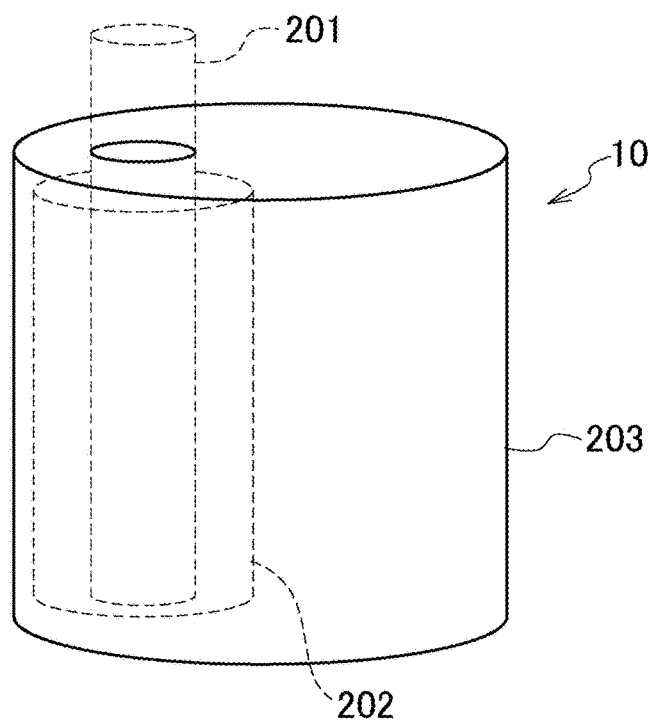
FIG. 10 is a diagram showing mode switching conditions of the circuit configuration shown in FIG. 7.
FIG. 11 is a sectional view of a power supply unit for an aerosol inhaler (an aerosol inhaler) according to a second embodiment of the present invention.

As shown in FIG. 10, when the power supply unit 10 is operated in the power reception mode, the control unit 50 turns off the bypass circuit switch 74, turns on the smoothing capacitor switch 75, and then turns off all the transistors TH1, TL1, TH2, TL2 of the inverter 44. In such a power reception mode, as shown in FIG. 8, an alternating current received by the power reception coil 43 from the power transmission coil 61 is converted into a direct current by the inverter 44 functioning as the rectifier, then smoothed by the smoothing capacitor 47, and supplied to the charger 13.

As shown in FIG. 10, when the power supply unit 10 is operated in the power transmission mode, the control unit 50 turns on the bypass circuit switch 74, turns off the smoothing capacitor switch 75, and then performs on and off control (DC and AC conversion control) on the transistors TH1, TL1, TH2, TL2 of the inverter 44. As described above, specific on and off control may switch between a state where the transistors TH1 and TL2 are turned on and the transistors TH2 and TL1 are turned off, and a state where the transistors TH1 and TL2 are turned off and the transistors TH2 and TL1 are turned on. In such a power transmission mode, as shown in FIG. 9, the DC power of the power supply 12 is supplied to the inverter 44 without passing through the charger 13 and the smoothing capacitor 47, is converted into the AC power by the inverter 44, and is supplied to the power reception coil 43 functioning as the power transmission coil. The AC power is transmitted from the power reception coil 43 functioning as the power transmission coil to the power reception coil 62 of another device.

Next, second and third embodiments of the power supply unit 10 will be sequentially described with reference to FIGS. 11 to 21. Note that description of the first embodiment is incorporated by denoting the same configurations as those of the first embodiment with the same reference numerals as in the first embodiment. A power supply unit in the second embodiment has an induction heating coil 202 described below, and thus may be referred to as an aerosol inhaler in the following description. In addition, a power supply unit in the third embodiment includes a power transmission coil 302 described below, and thus may be referred to as a charging unit in the following description.

Second Embodiment

Figure 12:
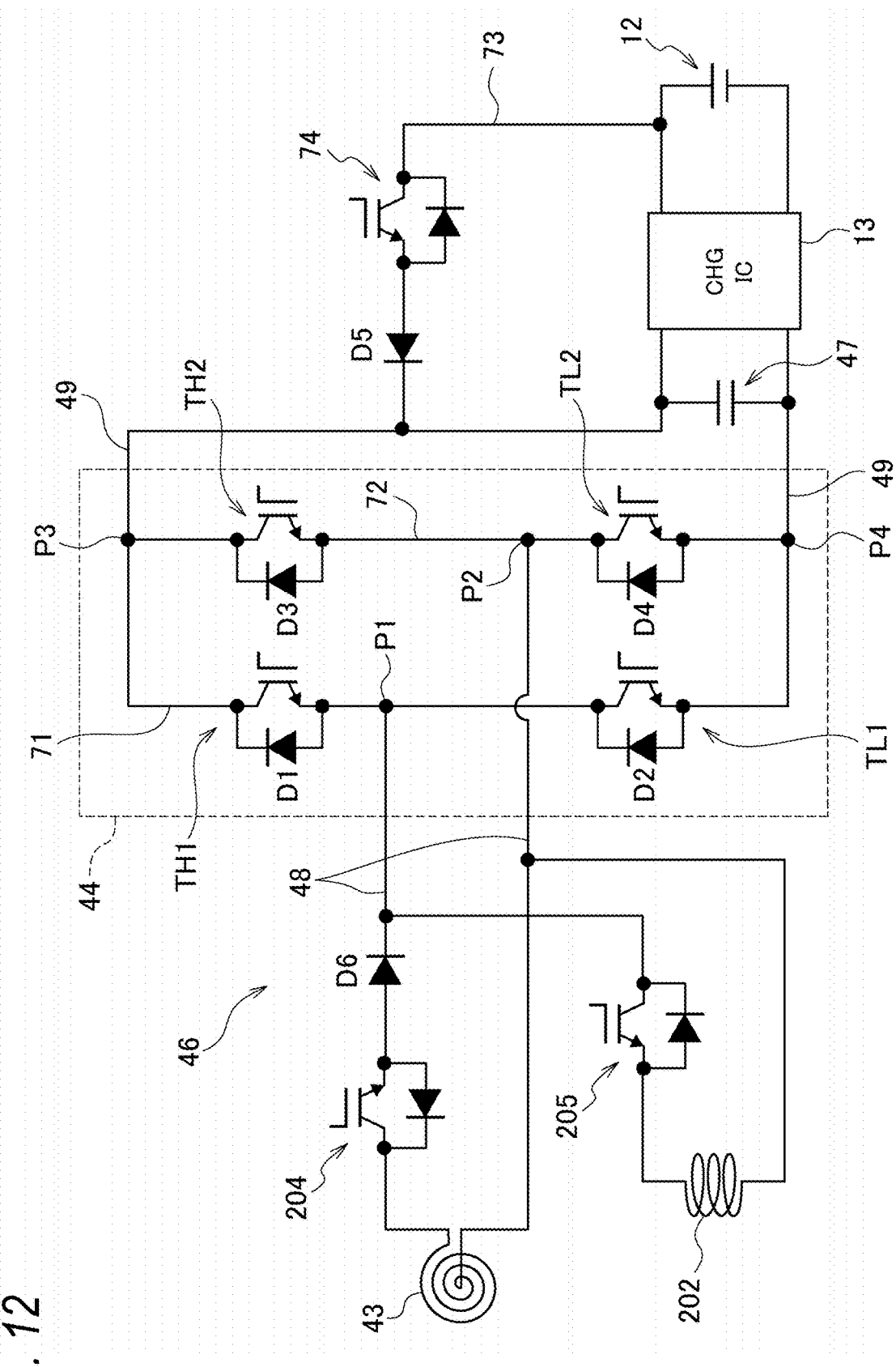
FIG. 12 is a schematic diagram showing a circuit configuration of the power supply unit of the aerosol inhaler (the aerosol inhaler) shown in FIG. 11.

As shown in FIGS. 11 and 12, the power supply unit 10 (or the aerosol inhaler) according to the second embodiment is connected to the inverter 44 so as to be in parallel with the power reception coil 43, and includes the induction heating coil 202 capable of generating aerosol from an aerosol source 201 described below. The induction heating coil 202 is accommodated in a housing 203 together with the power supply 12, the charger 13, the power reception coil 43 and the inverter 44. According to such a power supply unit 10 (or the aerosol inhaler), the multifunctional power supply unit 10 (or the aerosol inhaler) can be prevented from increasing in weight and size while implementing both a wireless charging mode in which wireless charging is performed via the power reception coil 43 and an IH mode in which the aerosol source 201 is heated via the induction heating coil 202. As described above, in the present embodiment, since the induction heating coil 202 is accommodated in the housing 203 accommodating the power supply 12, the power supply unit 10 can also be referred to as the aerosol inhaler.

The aerosol source 201 may include a filler and wrapping paper that wraps the filler. The filler may be formed of cut tobacco and glycerin or propylene glycol added to the cut tobacco.

As shown in FIG. 12, an electric circuit of the power supply unit 10 (or the aerosol inhaler) according to the second embodiment further includes a power reception coil switch 204 that disconnects electrical connection between the power reception coil 43 and the inverter 44, and an induction heating coil switch 205 that connects and disconnects electrical connection between the induction heating coil 202 and the inverter 44. Each of the power reception coil switch 204 and the induction heating coil switch 205 includes, for example, a MOSFET and a diode connected in parallel, and is controlled to be opened and closed by the control unit 50 adjusting a gate voltage of the MOSFET. A diode D6 that regulates a flow of a current from the inverter 44 to the power reception coil 43 is preferably provided between the power reception coil switch 204 and the inverter 44.

According to such a power supply unit 10 (or the aerosol inhaler), while the power reception coil 43 and the induction heating coil 202 are connected in parallel to the inverter 44, the power reception coil 43 and the induction heating coil 202 can function exclusively by switching the power reception coil switch 204 and the induction heating coil switch 205.

Figure 13:
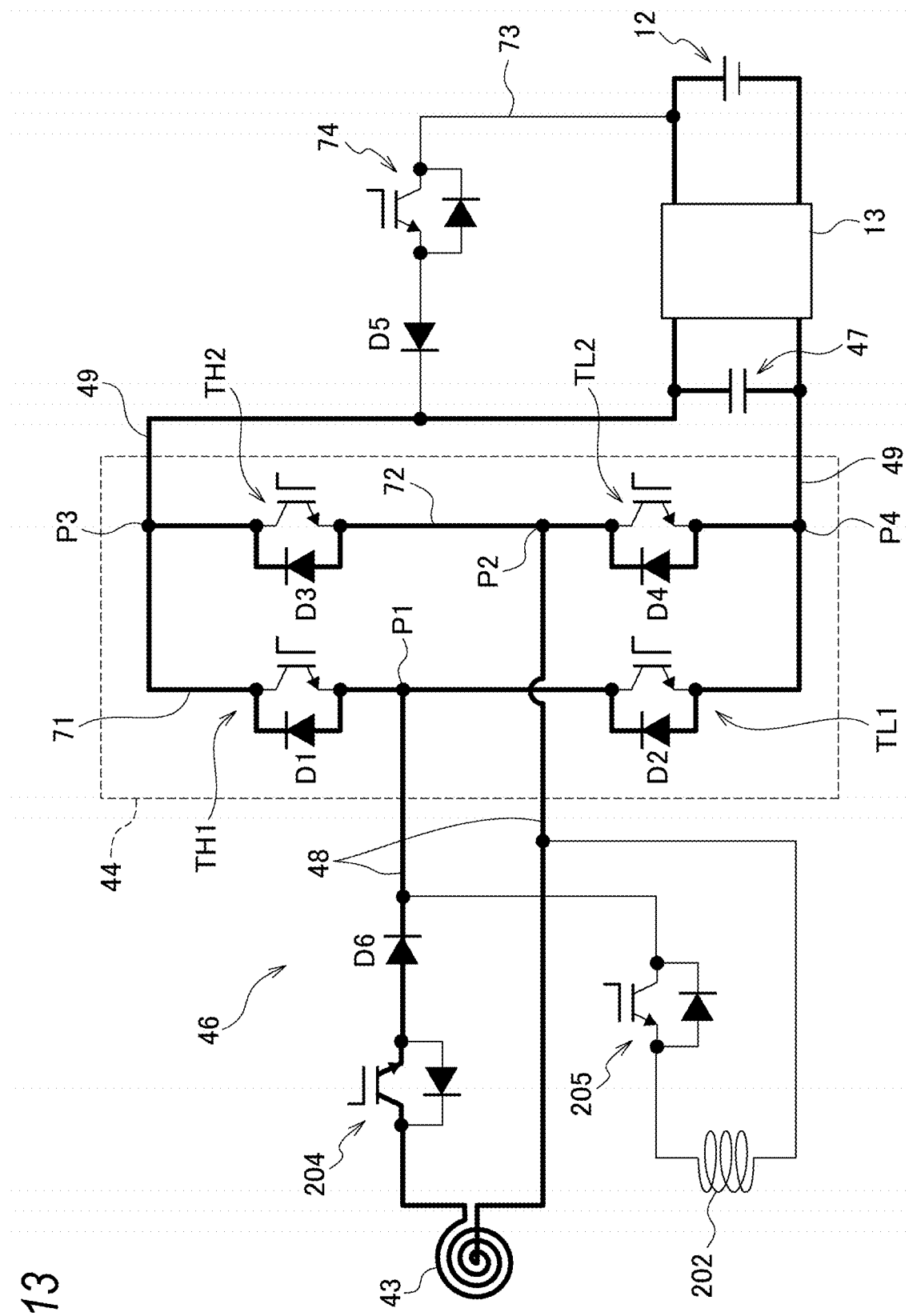
FIG. 13 is a diagram showing a flow of electricity in a wireless charging mode in the circuit configuration shown in FIG. 12.
Figure 14:
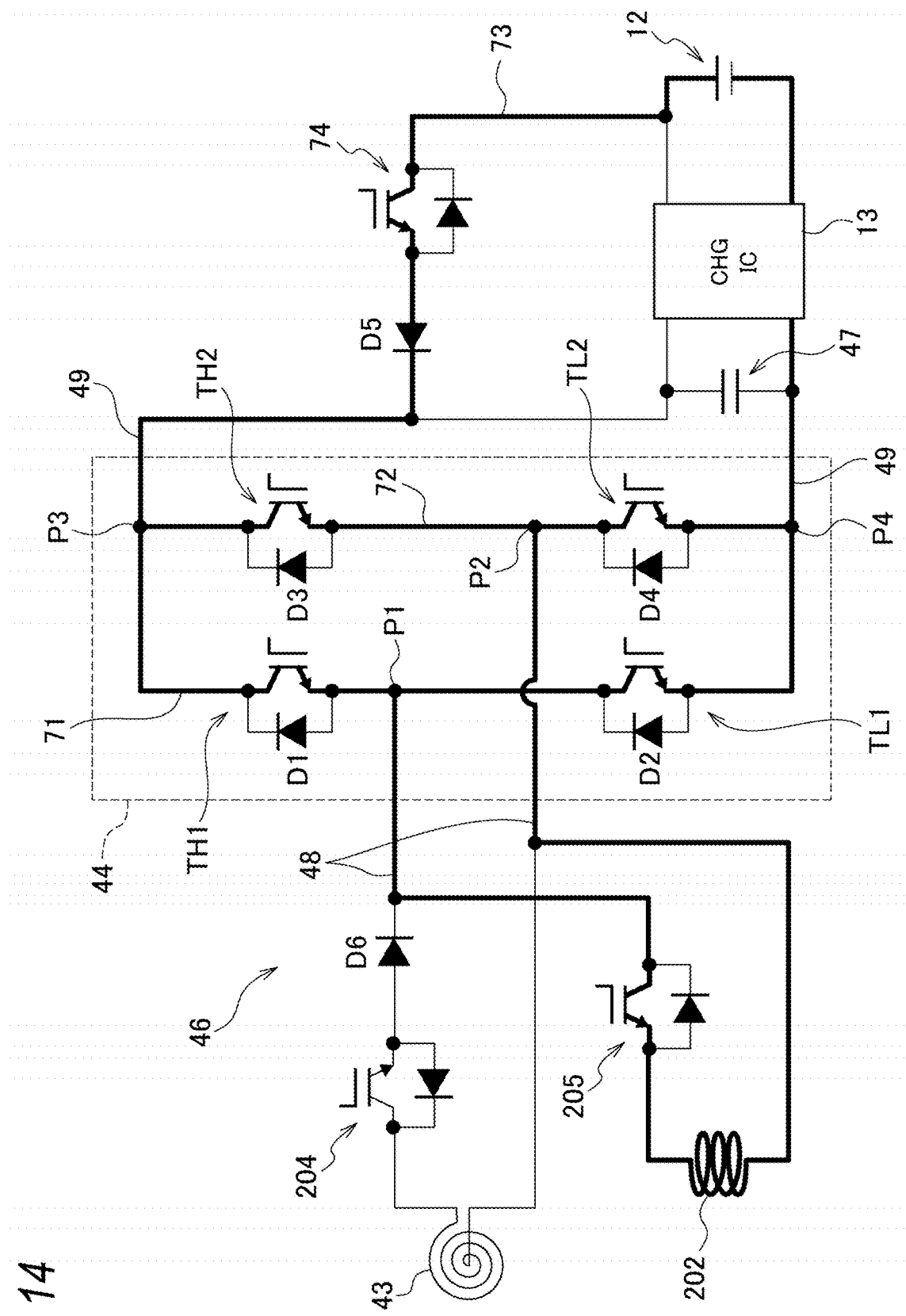
FIG. 14 is a diagram showing a flow of electricity in an IH mode in the circuit configuration shown in FIG. 12.

Switching conditions of the inverter 44, the power reception coil switch 204, the induction heating coil switch 205 and the bypass circuit switch 74 in the wireless charging mode and the IH mode, and operation of each unit in the wireless charging mode and the IH mode will be described with reference to FIGS. 13 to 15.

As shown in FIG. 15, when the power supply unit 10 (or the aerosol inhaler) is operated in the wireless charging mode, the control unit 50 turns on the power reception coil switch 204, turns off the induction heating coil switch 205, turns off the bypass circuit switch 74, and then turns on all the transistors TH1, TL1, TH2, TL2 of the inverter 44. In such a wireless charging mode, as shown in FIG. 13, an alternating current received by the power reception coil 43 is converted into a direct current by the inverter 44 functioning as a rectifier, then smoothed by the smoothing capacitor 47, and supplied to the charger 13.

As shown in FIG. 15, when the power supply unit 10 (or the aerosol inhaler) is operated in the IH mode, the control unit 50 turns off the power reception coil switch 204, turns on the induction heating coil switch 205, turns on the bypass circuit switch 74, and then performs on and off control (DC and AC conversion control) on the transistors TH1, TL1, TH2, TL2 of the inverter 44. As described above, specific on and off control may switch between a state where the transistors TH1 and TL2 are turned on and the transistors TH2 and TL1 are turned off, and a state where the transistors TH1 and TL2 are turned off and the transistors TH2 and TL1 are turned on. In such an IH mode, as shown in FIG. 14, the DC power of the power supply 12 is supplied to the inverter 44 without passing through the charger 13, is converted into the AC power by the inverter 44, and is supplied to the induction heating coil 202.

Modification of Second Embodiment

Figure 16:
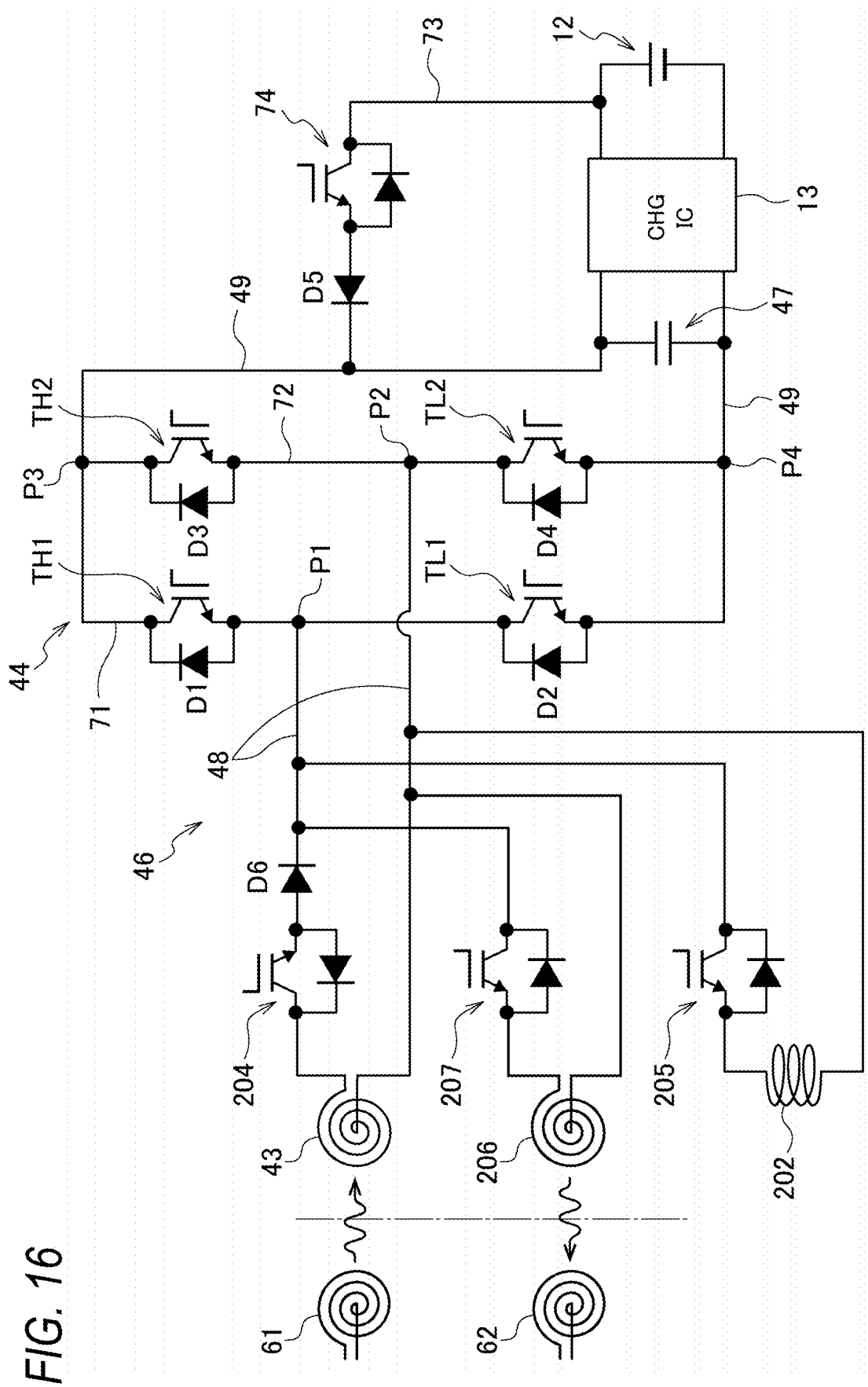
FIG. 16 is a schematic diagram showing a modification of the circuit configuration of the aerosol inhaler shown in FIG. 11.

The electric circuit of the power supply unit 10 (or the aerosol inhaler) according to the second embodiment may be deformed as shown in FIG. 16. Specifically, a power transmission coil 206 connected to the inverter 44 so as to be in parallel with the power reception coil 43 and the induction heating coil 202 and capable of transmitting the AC power to another device, and a power transmission coil switch 207 that connects and disconnects electrical connection between the power transmission coil 206 and the inverter 44, are further provided. The power transmission coil switch 207 includes, for example, a MOSFET and a diode connected in parallel, and is controlled to be opened and closed by the control unit 50 adjusting a gate voltage of the MOSFET.

According to such a power supply unit 10 (or the aerosol inhaler), the multifunctional power supply unit 10 (or the aerosol inhaler) can be prevented from increasing in weight and size while implementing the wireless charging mode in which the wireless charging is performed via the power reception coil 43, the IH mode in which the aerosol source 201 is heated via the induction heating coil 202, and the power transmission mode in which the AC power can be transmitted to another device via power transmission coil 206. While the power reception coil 43, the induction heating coil 202 and the power transmission coil 206 are connected in parallel to the inverter 44, the power reception coil 43, the induction heating coil 202 and the power transmission coil 206 can respectively function exclusively by switching the power reception coil switch 204, the induction heating coil switch 205 and the power transmission coil switch 207.

Third Embodiment

Figure 17:
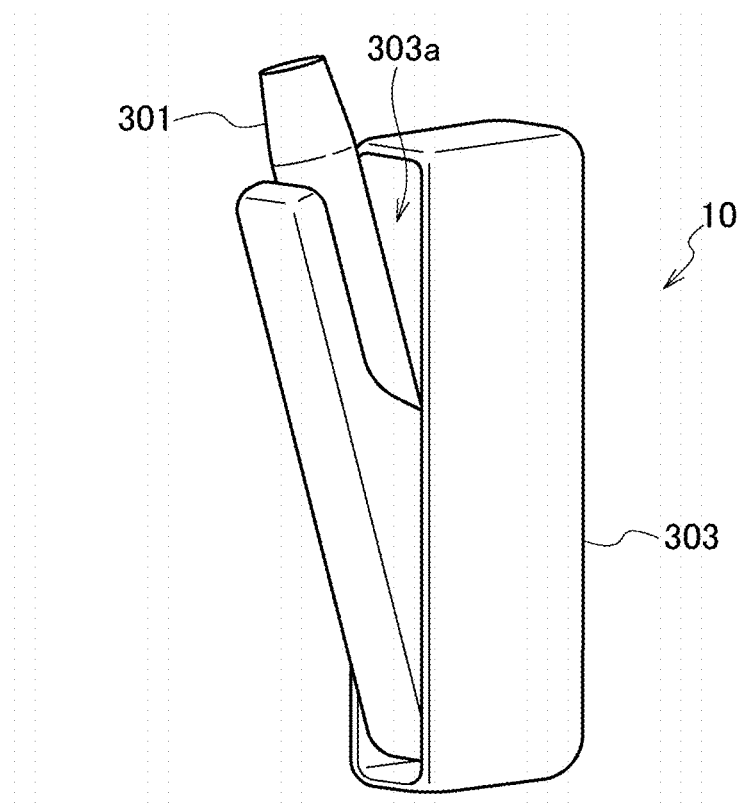
FIG. 17 is a sectional view of a power supply unit for an aerosol inhaler (a charging unit) according to a third embodiment of the present invention.
Figure 18:
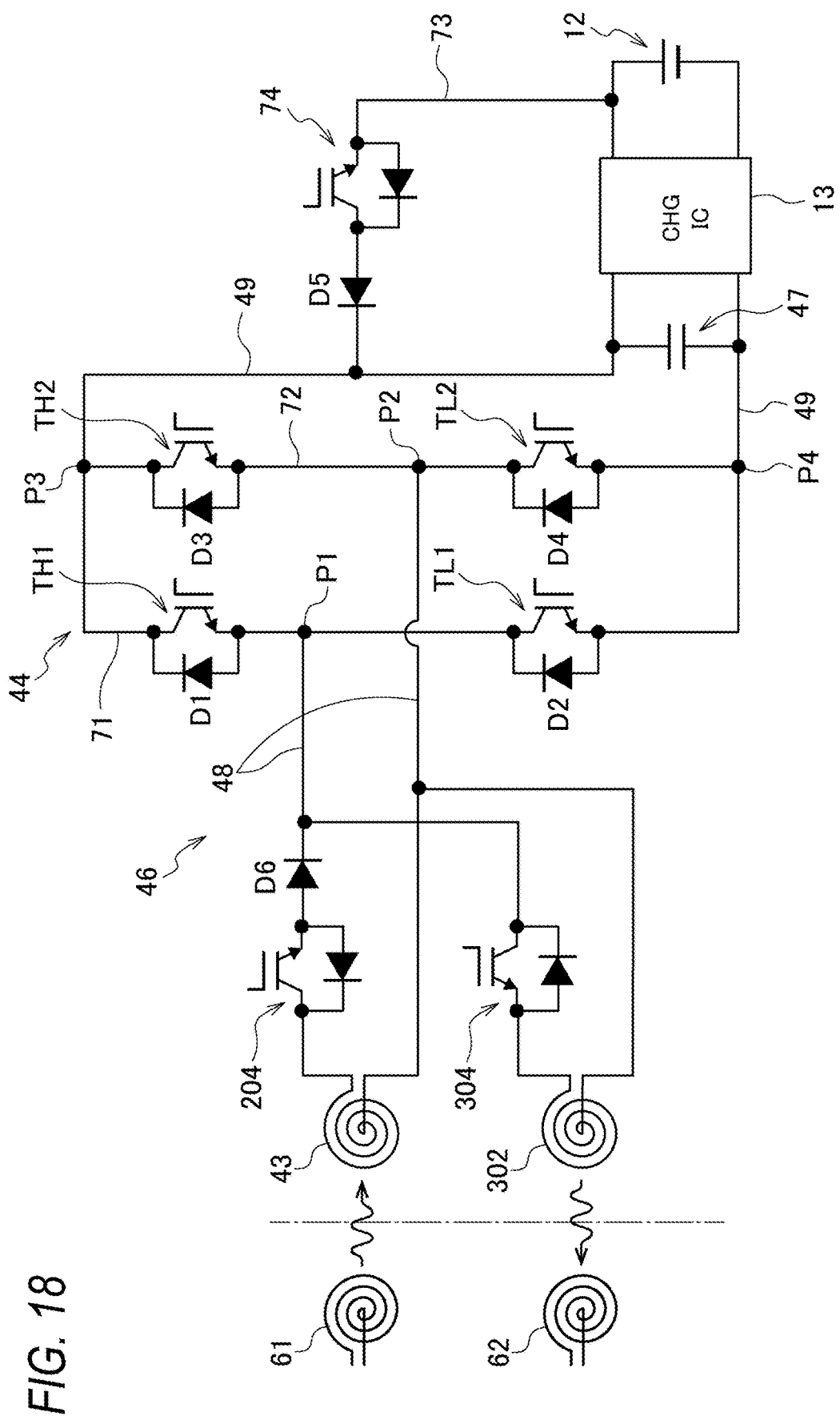
FIG. 18 is a schematic diagram showing a circuit configuration of the power supply unit of the aerosol inhaler (the charging unit) shown in FIG. 17.

As shown in FIGS. 17 and 18, the power supply unit 10 (the charging unit) according to the third embodiment is a portable charging device capable of charging a power supply (not shown) of an aerosol inhaler 301 that is accommodated in a removable manner. Specifically, the power supply unit 10 (the charging unit) according to the third embodiment is connected to the inverter 44 so as to be in parallel with the power reception coil 43, and includes a power transmission coil 302 capable of supplying power to the aerosol inhaler 301 in a wireless manner, and a housing 303 that accommodates the power supply 12, the charger 13, the power reception coil 43, the inverter 44 and the power transmission coil 302 and has an inhaler accommodation portion 303*a* that accommodates the aerosol inhaler 301 in the removable manner. According to such a power supply unit 10 (the charging unit), since the power transmission coil 302 capable of supplying the power to the aerosol inhaler 301 in the wireless manner is connected to the inverter 44 in parallel with the power reception coil 43, the power supply unit 10 (the charging unit) can be prevented from increasing in weight and size while being capable of performing both a power reception mode in which the power is received in the wireless manner and a power transmission mode in which the power is transmitted in the wireless manner. As described above, in the present embodiment, since the power transmission coil 302 for charging the aerosol inhaler 301 is accommodated together with the power supply 12 in the housing 303 having the inhaler accommodation portion 303*a*, the power supply unit 10 can also be referred to as the charging unit for the aerosol inhaler.

As shown in FIG. 18, an electric circuit of the power supply unit 10 (the charging unit) according to the third embodiment further includes a power transmission coil switch 304 that connects and disconnects electrical connection between the power transmission coil 302 and the inverter 44. The power transmission coil switch 304 includes, for example, a MOSFET and a diode connected in parallel, and is controlled to be opened and closed by the control unit 50 adjusting a gate voltage of the MOSFET. According to such a power supply unit 10 (the charging unit), while the power reception coil 43 and the power transmission coil 302 are connected in parallel to the inverter 44, the power reception coil 43 and the power transmission coil 302 can function exclusively by switching the power reception coil switch 204 and the power transmission coil switch 304.

Figure 19:
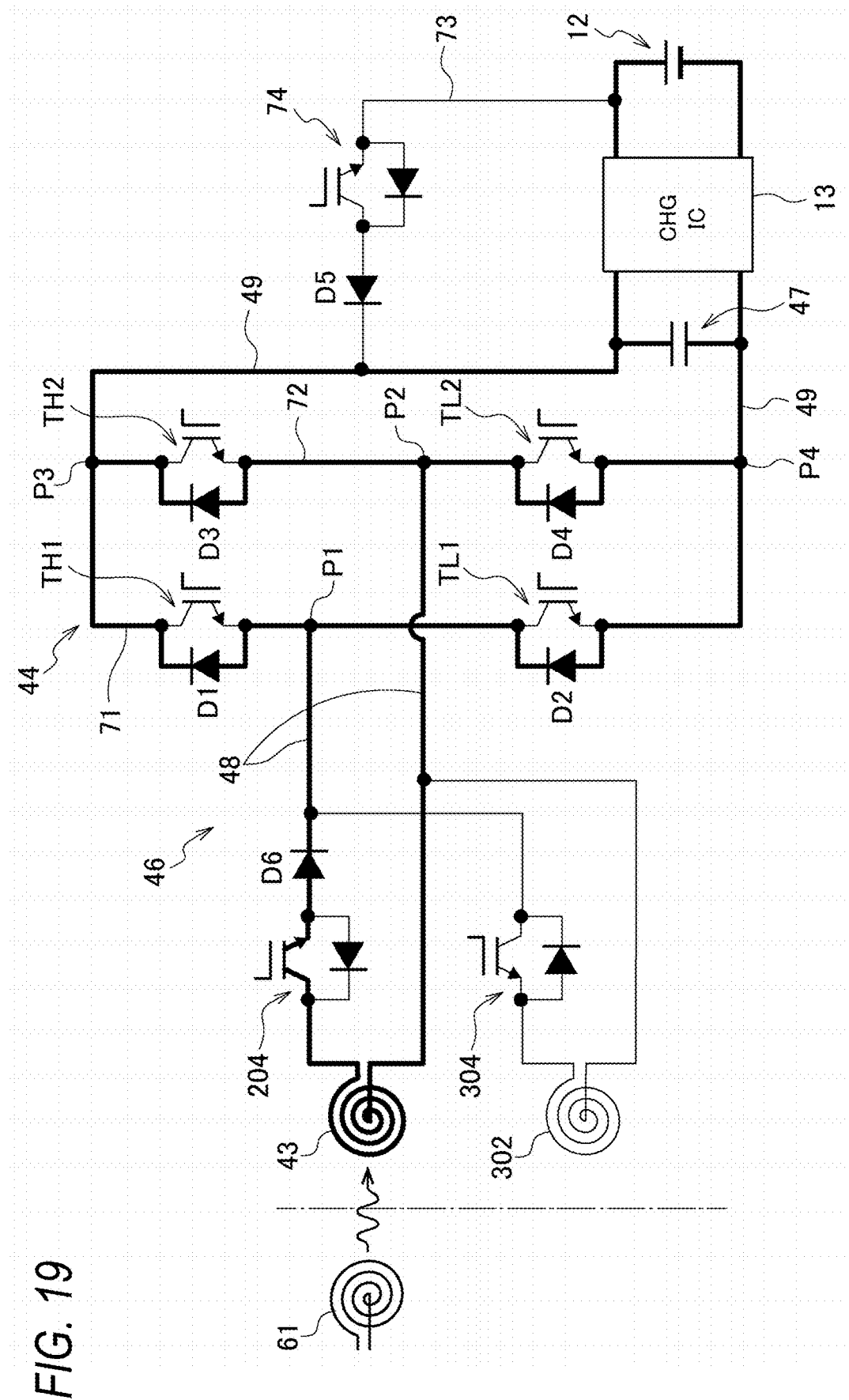
FIG. 19 is a diagram showing a flow of electricity when the power supply unit is in wireless charging (in a power reception mode) in the circuit configuration shown in FIG. 18.
Figure 20:
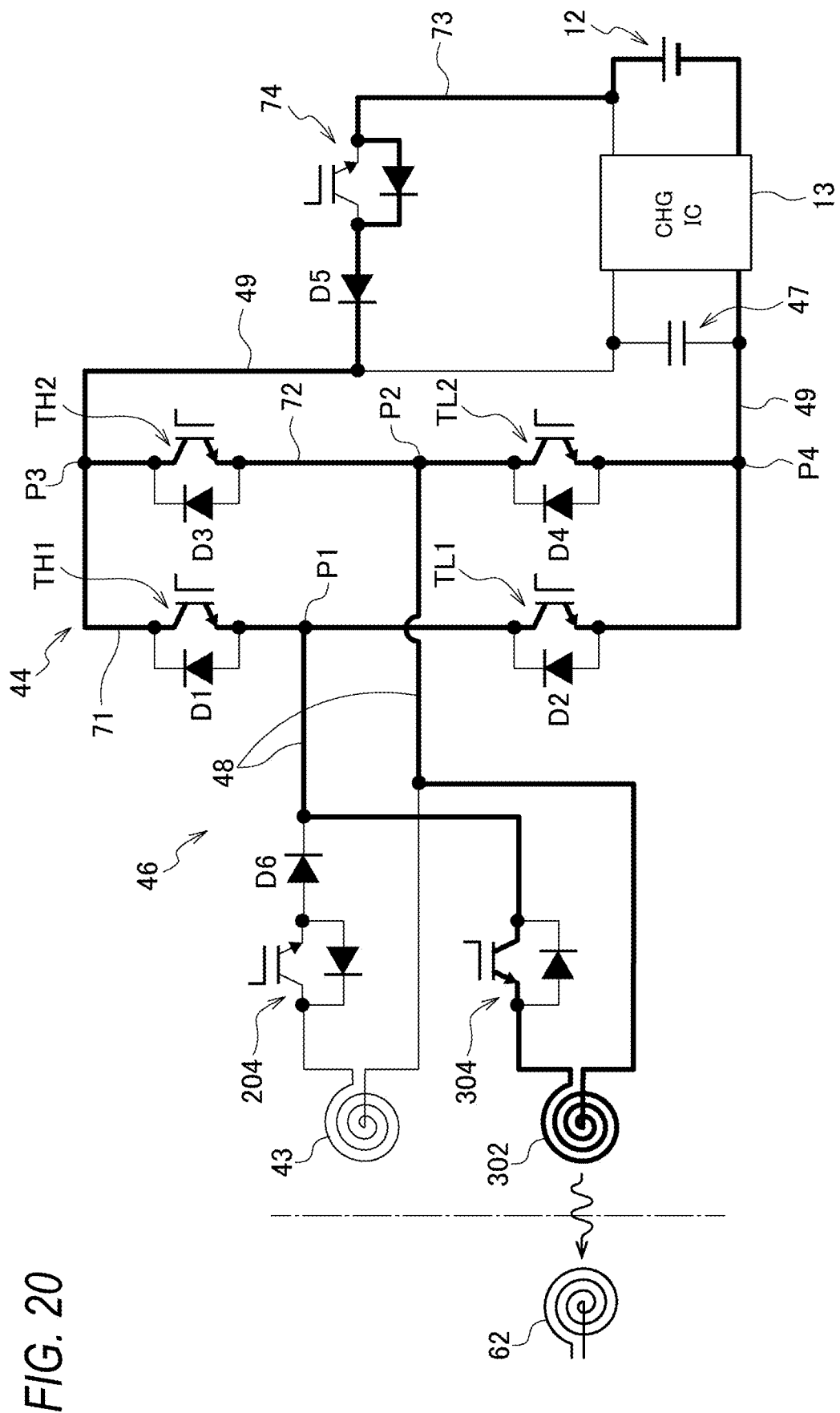
FIG. 20 is a diagram showing a flow of electricity when the aerosol inhaler is in wireless charging (in a power transmission mode) in the circuit configuration shown in FIG. 18.

Switching conditions of the inverter 44, the power reception coil switch 204, the power transmission coil switch 304 and the bypass circuit switch 74 in the power reception mode and the power transmission mode, and operation of each unit in the power reception mode and the power transmission mode will be described with reference to FIGS. 19 to 21.

As shown in FIG. 21, when the power supply unit 10 (the charging unit) is operated in the power reception mode, the control unit 50 turns on the power reception coil switch 204, turns off the power transmission coil switch 304, turns off the bypass circuit switch 74, and then turns off all the transistors TH1, TL1, TH2, TL2 of the inverter 44. In such a power reception mode, as shown in FIG. 19, an alternating current received by the power reception coil 43 is converted into a direct current by the inverter 44 functioning as a rectifier, then smoothed by the smoothing capacitor 47, and supplied to the charger 13.

As shown in FIG. 21, when the power supply unit 10 (the charging unit) is operated in the power transmission mode, the control unit 50 turns off the power reception coil switch 204, turns on the power transmission coil switch 304, turns on the bypass circuit switch 74, and then performs on and off control (DC and AC conversion control) on the transistors TH1, TL1, TH2, TL2 of the inverter 44. As described above, specific on and off control may switch between a state where the transistors TH1 and TL2 are turned on and the transistors TH2 and TL1 are turned off, and a state where the transistors TH1 and TL2 are turned off and the transistors TH2 and TL1 are turned on. In such a power transmission mode, as shown in FIG. 20, the DC power of the power supply 12 is supplied to the inverter 44 without passing through the charger 13, is converted into the AC power by the inverter 44, and is supplied to the power transmission coil 302. The AC power is transmitted from the power transmission coil 302 to the power reception coil 62 built in the aerosol inhaler 301.

Charging of the aerosol inhaler 301 by the power transmission coil 302 may be performed when the aerosol inhaler 301 is accommodated in the inhaler accommodation portion 303a, or may be performed when the aerosol inhaler 301 is not accommodated in the inhaler accommodation portion 303a. For example, when the aerosol inhaler 301 is accommodated in the inhaler accommodation portion 303a, the charging may be performed in the wireless manner via a connector (not shown), and when the aerosol inhaler 301 is placed on the housing 303 or is arranged in vicinity of the housing 303, the charging may be performed in the wireless manner by the power transmission coil 302.

The present invention is not limited to the above embodiments, and can be appropriately modified, improved and the like.

For example, the power reception coil also serving as a power transmission coil, the induction heating coil and the power transmission coil are exemplified as AC loads in the above embodiments, but the present invention can also be applied to other AC loads.

The present specification describes at least the following matters. Although corresponding constituent elements or the like in the above embodiments are illustrated in parentheses, the present invention is not limited thereto.

(1) A power supply unit (power supply unit 10) for an aerosol inhaler (aerosol inhaler 1) includes: a power supply (power supply 12) configured to store power to generate aerosol from an aerosol source; and a charger (charger 13) capable of controlling charging of the power supply, the power supply unit for the aerosol inhaler further includes: a power reception coil (power reception coil 43) capable of receiving the power in a wireless manner; and an inverter (inverter 44) connected between the power reception coil and the charger.

According to (1), since the inverter is used to rectify the power received in the wireless manner, an alternating current can be generated from the power supply in the power supply unit, and expandability of the power supply unit is improved.

(2) The power supply unit for the aerosol inhaler according to (1), in which the inverter rectifies the power received by the power reception coil.

According to (2), the inverter has two functions: a function as a rectifier that rectifies the power received by the power reception coil and a function of generating the alternating current from the power supply in the power supply unit. Therefore, compared to a case where each of the inverter and the rectifier is mounted on the power supply unit, the power supply unit can be prevented from increasing in size, weight and cost.

(3) The power supply unit for the aerosol inhaler according to (1) or (2), in which the inverter includes: a first tributary circuit (first tributary circuit 71) including a first high-side transistor (first high-side transistor TH1), a first low-side transistor (first low-side transistor TL1) and a first node (first connection point P1) connecting the first high-side transistor and the first low-side transistor in series; a second tributary circuit (second tributary circuit 72) including a second high-side transistor (second high-side transistor TH2), a second low-side transistor (second low-side transistor TL2) and a second node (second connection point P2) connecting the second high-side transistor and the second low-side transistor in series; and a third node (third connection point P3) and a fourth node (fourth connection point P4) connecting the first tributary circuit and the second tributary circuit in parallel, and in which the power reception coil is connected to the first node and the second node.

According to (3), the inverter can implement the two functions including the function of rectifying the power received in the wireless manner and the function of generating the alternating current from the power supply in the power supply unit by four transistors.

(4) The power supply unit for the aerosol inhaler according to (2) or (3), further includes: an AC load (induction heating coil 202, power transmission coil 206, 302) that functions by an alternating current, in which the AC load is connected to the inverter in parallel with the power reception coil, and in which the inverter controls function of the AC load.

According to (4), since the AC load connected in parallel to the power reception coil is provided, rectification of the power received by the power reception coil in the wireless manner and control of the AC load can be performed by one inverter. Thereby, the multifunctional power supply unit can be prevented from increasing in weight and size.

(5) The power supply unit for the aerosol inhaler according to (4), further includes: a first switch (power reception coil switch 204) configured to connect and disconnect electrical connection between the power reception coil and the inverter; and a second switch (induction heating coil switch 205, power transmission coil switch 207, 304) configured to connect and disconnect electrical connection between the AC load and the inverter.

According to (5), since the switch is connected to each of the power reception coil and the AC load, the power reception coil and the AC load can function exclusively.

(6) The power supply unit for the aerosol inhaler according to (4) or (5), further includes: a bypass circuit (bypass circuit 73) connected to the power supply and the inverter in parallel with the charger.

According to (6), since the bypass circuit that bypasses the charger is provided, the power can be supplied from the power supply to the AC load without passing through the charger. Thereby, power loss can be reduced and the charger can be protected when the AC load functions.

(7) The power supply unit for the aerosol inhaler according to (6), in which when wireless charging is performed by the power reception coil, only the charger among the charger and the bypass circuit functions.

According to (7), when the wireless charging is performed, since the bypass circuit does not function, appropriate charging power can be supplied to the charger. Further, since the power immediately after rectification by the inverter not passing through the charger is not supplied to the power supply, the power supply can be appropriately protected.

(8) The power supply unit for the aerosol inhaler according to (6) or (7), in which when the AC load is operated, only the bypass circuit among the charger and the bypass circuit functions.

According to (8), since the charger does not function when the AC load functions, in order for the AC load to function, the power discharged from the power supply can be prevented from circulating and returning to the power supply. Therefore, efficiency when the AC load functions is improved.

(9) The power supply unit for the aerosol inhaler according to any one of (6) to (8), further includes: a smoothing capacitor (smoothing capacitor 47) connected in parallel to the inverter and the charger between the inverter and the charger, in which one end of the bypass circuit is connected between the inverter and the smoothing capacitor, and another end thereof is connected between the charger and the power supply.

According to (9), when the wireless charging is performed, a voltage input to the charger by the smoothing capacitor can be stabilized.

(10) The power supply unit for the aerosol inhaler according to (9), further includes: a third switch (bypass circuit switch 74) provided in the bypass circuit and configured to connect and disconnect electrical connection between the power supply and the inverter; and a fourth switch (smoothing capacitor switch 75) configured to connect and disconnect electrical connection between the one end of the bypass circuit and the smoothing capacitor.

According to (10), when the AC load functions, the bypass circuit bypasses the smoothing capacitor, thereby eliminating a time lag until the AC load functions, which is generated due to charging of the smoothing capacitor.

(11) The power supply unit for the aerosol inhaler according to (4) or (5), in which the AC load includes an induction heating coil (induction heating coil 202).

According to (11), since the induction heating coil is connected to the inverter, the multifunctional power supply unit can be prevented from increasing in weight and size while being capable of both induction heating and wireless charging.

(12) The power supply unit for the aerosol inhaler according to (4) or (5), in which the AC load includes a power transmission coil (power transmission coil 206, 302) capable of supplying the power in the wireless manner.

According to (12), since the supply coil is connected to the inverter, the multifunctional power supply unit can be prevented from increasing in weight and size while being capable of both wireless power transmission and power reception.

(13) The power supply unit for the aerosol inhaler according to any one of (1) to (12), in which the inverter is configured to convert DC power supplied by the power supply into AC power, and in which the power reception coil is capable of supplying the power in the wireless manner by the AC power.

According to (13), since both wireless power transmission and power reception can be implemented by one coil, the multifunctional power supply unit can be prevented from increasing in weight and size while being capable of both wireless power transmission and power reception.

(14) An aerosol inhaler includes: a power supply (power supply 12) configured to store power to generate aerosol from an aerosol source; a charger (charger 13) capable of controlling charging of the power supply; a power reception coil (power reception coil 43) capable of receiving the power in a wireless manner; an inverter (inverter 44) connected between the power reception coil and the charger; an induction heating coil (induction heating coil 202) connected to the inverter in parallel with the power reception coil, and capable of generating the aerosol from the aerosol source; and a housing (housing 203) accommodating the power supply, the charger, the power reception coil, the induction heating coil and the inverter.

According to (14), since the induction heating coil capable of generating the aerosol from the aerosol source is connected in parallel with the power reception coil to the inverter connected between the power reception coil and the charger, the multifunctional aerosol inhaler can be prevented from increasing in weight and size while being capable of both induction heating and wireless charging.

(15) A charging unit for an aerosol inhaler includes: a power supply (power supply 12); a charger (charger 13) capable of controlling charging of the power supply; a power reception coil (power reception coil 43) capable of receiving the power in a wireless manner; an inverter (inverter 44) connected between the power reception coil and the charger; a power transmission coil (power transmission coil 302) connected to the inverter in parallel with the power reception coil, and capable of supplying the power to the aerosol inhaler (aerosol inhaler 301) in the wireless manner; and a housing (housing 303) accommodating the power supply, the charger, the power reception coil, the inverter and the power transmission coil, in which the housing is provided with an inhaler accommodation portion (inhaler accommodation portion 303a) configured to accommodate the aerosol inhaler.

According to (15), since the power transmission coil capable of supplying the power to the aerosol inhaler in the wireless manner is connected in parallel with the power reception coil to the inverter connected between the power reception coil and the charger, the charging unit can be prevented from increasing in weight and size while being capable of both wireless power transmission and power reception.

What is claimed is:

1. A power supply unit for an aerosol inhaler comprising:
    a power supply configured to store power to generate aerosol from an aerosol source; and
    a charger configured to control charging of the power supply;
    a power reception coil configured to receive the power in a wireless manner; and
    an inverter connected between the power reception coil and the charger, wherein
    the inverter includes:
        a first tributary circuit including a first high-side transistor, a first low-side transistor and a first node connecting the first high-side transistor and the first low-side transistor in series;
        a second tributary circuit including a second high-side transistor, a second low-side transistor and a second node connecting the second high-side transistor and the second low-side transistor in series; and
        a third node and a fourth node connecting the first tributary circuit and the second tributary circuit in parallel, and
    wherein the power reception coil is connected to the first node and the second node.

2. A power supply unit for an aerosol inhaler comprising:
    a power supply configured to store power to generate aerosol from an aerosol source; and
    a charger configured to control charging of the power supply;
    a power reception coil configured to receive the power in a wireless manner;
    an inverter connected between the power reception coil and the charger and configured to rectify the power received by the power reception coil; and
    an AC load that functions by an alternating current, wherein
    the AC load is connected to the inverter in parallel with the power reception coil, and
    the inverter controls function of the AC load.

3. The power supply unit for the aerosol inhaler according to claim 2, further comprising:

a first switch configured to connect and disconnect electrical connection between the power reception coil and the inverter; and a second switch configured to connect and disconnect electrical connection between the AC load and the inverter.

4. The power supply unit for the aerosol inhaler according to claim 2, further comprising:
a bypass circuit connected to the power supply and the inverter in parallel with the charger.

5. The power supply unit for the aerosol inhaler according to claim 4,
wherein when wireless charging is performed by the power reception coil, only the charger among the charger and the bypass circuit functions.

6. The power supply unit for the aerosol inhaler according to claim 4,
wherein when the AC load is operated, only the bypass circuit among the charger and the bypass circuit functions.

7. The power supply unit for the aerosol inhaler according to claim 4, further comprising:
a smoothing capacitor connected in parallel to the inverter and the charger between the inverter and the charger,
wherein one end of the bypass circuit is connected between the inverter and the smoothing capacitor, and another end thereof is connected between the charger and the power supply.

8. The power supply unit for the aerosol inhaler according to claim 7, further comprising:
a third switch provided in the bypass circuit and configured to connect and disconnect electrical connection between the power supply and the inverter; and
a fourth switch configured to connect and disconnect electrical connection between the one end of the bypass circuit and the smoothing capacitor.

9. The power supply unit for the aerosol inhaler according to claim 2,
wherein the AC load includes a power transmission coil configured to supply the power in the wireless manner.

10. The power supply unit for the aerosol inhaler according to claim 1,
wherein the inverter is configured to convert DC power supplied by the power supply into AC power, and
wherein the power reception coil is configured to supply the power in the wireless manner by the AC power.

11. The power supply unit for the aerosol inhaler according to claim 2, wherein the inverter includes:
a first tributary circuit including a first high-side transistor, a first low-side transistor and a first node connecting the first high-side transistor and the first low-side transistor in series;
a second tributary circuit including a second high-side transistor, a second low-side transistor and a second node connecting the second high-side transistor and the second low-side transistor in series; and
a third node and a fourth node connecting the first tributary circuit and the second tributary circuit in parallel, and
the power reception coil is connected to the first node and the second node.

12. The power supply unit for the aerosol inhaler according to claim 2, wherein
the inverter is configured to convert DC power supplied by the power supply into AC power, and
the power reception coil is configured to supply the power in the wireless manner by the AC power.

13. A power supply unit for an aerosol inhaler comprising:
a power supply configured to store power to generate aerosol from an aerosol source;
a charger configured to control charging of the power supply;
a power reception coil configured to receive the power in a wireless manner;
an inverter connected between the power reception coil and the charger and configured to convert DC power supplied by the power supply into AC power; and
a bypass circuit connected to the power supply and the inverter in parallel with the charger, wherein
the power reception coil is configured to supply the power in the wireless manner by the AC power.

* * * * *